(12) United States Patent
Jenne

(10) Patent No.: US 8,496,031 B2
(45) Date of Patent: *Jul. 30, 2013

(54) TIPLESS CAN FILLING VALVE

(75) Inventor: Richard D. Jenne, Willowick, OH (US)

(73) Assignee: Bevcorp, LLC, Willoughby, OH (US)

( * ) Notice: Subject to any disclaimer, the term of this patent is extended or adjusted under 35 U.S.C. 154(b) by 339 days.

This patent is subject to a terminal disclaimer.

(21) Appl. No.: 12/834,886

(22) Filed: Jul. 12, 2010

(65) Prior Publication Data

US 2011/0005638 A1   Jan. 13, 2011

Related U.S. Application Data

(63) Continuation-in-part of application No. 11/779,987, filed on Jul. 19, 2007, now Pat. No. 7,753,093.

(60) Provisional application No. 60/826,499, filed on Sep. 21, 2006.

(51) Int. Cl.
*B65B 1/04* (2006.01)
*B60K 15/04* (2006.01)

(52) U.S. Cl.
CPC ........................... *B60K 15/04* (2013.01)
USPC ............... 141/286; 141/57; 141/285

(58) Field of Classification Search
USPC ............... 141/57, 144–147, 285–287
See application file for complete search history.

(56) References Cited

U.S. PATENT DOCUMENTS

| | | | |
|---|---|---|---|
| 2,461,326 A | 2/1949 | Edward | |
| 3,500,879 A * | 3/1970 | Meyer | 141/1 |
| 3,519,035 A | 7/1970 | Remane | |
| 3,534,788 A | 10/1970 | Trusselle | |
| 3,626,996 A | 12/1971 | Bingham | |
| 3,683,976 A | 8/1972 | Remane | |
| 4,089,353 A | 5/1978 | Antonelli | |
| 4,349,055 A | 9/1982 | DiChiara | |
| 4,363,339 A | 12/1982 | Puskarz | |
| 4,387,748 A * | 6/1983 | White | 141/57 |
| 4,442,873 A | 4/1984 | Yun | |
| 4,679,603 A | 7/1987 | Rademacher et al. | |
| 4,750,533 A | 6/1988 | Yun | |
| 4,938,261 A | 7/1990 | Petri et al. | |
| 4,979,546 A | 12/1990 | LaWarre | |
| 4,986,318 A | 1/1991 | Yun | |
| 5,060,702 A | 10/1991 | LaWarre | |
| 5,085,255 A | 2/1992 | LaWarre | |
| 5,094,278 A | 3/1992 | Arao et al. | |
| 5,139,058 A | 8/1992 | Yun | |
| 5,141,035 A * | 8/1992 | Nish et al. | 141/1 |
| 5,150,740 A | 9/1992 | Yun | |
| 5,156,200 A | 10/1992 | Mette | |

(Continued)

*Primary Examiner* — Timothy L Maust
(74) *Attorney, Agent, or Firm* — Hahn Loeser + Parks LLP; Scott M. Oldham, Esq.

(57) ABSTRACT

A filling valve is provided for filling containers such as beverage cans. The valve includes a tipless nozzle having ports oriented for directing flow. The nozzle includes a valve seat having a planar sealing surface. A spring actuated vent seal is provided for closing the vent tube. The valve stem may have protrusions for centering the stem in the valve body. The filling valve may have a bell forming a cavity between the bell and the valve body, and an aperture for directing cleaning fluid from within the bell to the cavity. The valve body may have a duct for directing cleaning fluid from the cavity to an outlet.

9 Claims, 17 Drawing Sheets

U.S. PATENT DOCUMENTS

| | | | |
|---|---|---|---|
| 5,190,084 A | 3/1993 | Diehl et al. | |
| 5,474,113 A | 12/1995 | Rademacher | |
| 5,501,253 A * | 3/1996 | Weiss | 141/40 |
| 5,884,677 A | 3/1999 | McKaughan | |
| 5,924,462 A | 7/1999 | McKaughan | |
| 5,944,072 A | 8/1999 | Tietz et al. | |
| 5,954,100 A * | 9/1999 | Nish et al. | 141/57 |
| 5,960,838 A | 10/1999 | Tietz et al. | |
| 6,076,567 A | 6/2000 | Naecker et al. | |
| 6,082,418 A | 7/2000 | Naecker et al. | |
| 6,109,483 A | 8/2000 | Wilke et al. | |
| 6,112,778 A * | 9/2000 | Nish et al. | 141/6 |
| 6,131,624 A | 10/2000 | Paradies | |
| 6,135,166 A | 10/2000 | Paradies et al. | |
| 6,155,314 A | 12/2000 | Ding et al. | |
| 6,179,016 B1 | 1/2001 | Neacker et al. | |
| 6,223,435 B1 | 5/2001 | Stavrakis | |
| 6,230,767 B1 | 5/2001 | Nelson | |
| 6,244,309 B1 | 6/2001 | Martin | |
| 6,390,148 B2 | 5/2002 | Martin | |
| 6,397,909 B1 | 6/2002 | Nelson | |
| 6,484,762 B2 | 11/2002 | Fehland | |
| 6,742,556 B1 * | 6/2004 | Osuna et al. | 141/301 |
| 7,127,870 B2 | 10/2006 | McRay et al. | |
| 7,287,562 B2 | 10/2007 | Tanikawa et al. | |
| 7,753,093 B2 * | 7/2010 | Jenne | 141/287 |
| 2005/0086909 A1 | 4/2005 | Krulitsch | |
| 2006/0283518 A1 | 12/2006 | Ricker et al. | |

\* cited by examiner

TIPLESS CAN FILLING VALVE

This application is a continuation in part of U.S. patent application Ser. No. 11/779,987, filed Jul. 19, 2007, which claims the benefit of U.S. Provisional Application 60/826,499, filed Sep. 21, 2006, the disclosures of both of which are incorporated herein by reference.

TECHNICAL FIELD

In automatic beverage filling machines, the developments relate to the filling valves associated with such machines to allow for more accurate and higher speed filling processes.

BACKGROUND

Beverage cans may be filled by automated container filling systems, wherein an empty can or other container is engaged with a filling valve, and the beverage dispenses from the filling valve into the can. One automated container filling system provides counterpressure filling, in which the can is filled with pressurized gas before the beverage is dispensed. In one counterpressure filling system, a filling valve includes a seal that expands against the top of the can, thereby sealing the inside of the can for containing pressurized gas.

In general, a plurality of cans move through a rotary filler. Empty cans are presented to the filling valve as the rotary filler turns. After the filling valve fills the can, the can moves off of the rotary filler. In valves associated with known machines, various deficiencies are found to effective and fast filling procedures. One problem noted with known valves relates to the liquid seal within the valve, which has a wedge-shaped sealing surface which contacts a wedge seal seat, wherein the liquid seal has the tendency to be frictionally engaged in a manner that causes hesitation when opening the valve, thereby causing a short fill. Further, the liquid seal seat formed in such known valves has been formed integral with the valve body, so that it is not replaceable apart from the entire valve. A further impediment to achieving desired fill time with the known valve relates to the use of a screen positioned just beneath the sealing surface to assist in stopping flow of the liquid upon valve shutoff. The position of the screen is well above the valve outlet, allowing a significant amount of liquid to continue to drip from the valve after closure, and causing delay in completion of the fill. Other delays in the filling process are found in the need to snift a significant volume of gas upon completion of the fill from the headspace in the valve. Loss of liquid contents also could occur by the liquid entering the space around a can sealing member during the fill process, and being retained in association with the valve behind the can sealing member. Additional problems with known valves are found in the manner in which liquid is directed into the can or other container. With a can, known valves direct the liquid in a spiral fashion, but introduce the liquid in a direction which is well below the top of the can. This can cause disruption in the flow of the liquid into the container as the fill height increases.

Another problem with prior valves has been their ability to fill containers in a manner to reduce foaming or for filling containers of differing sizes. For example, as it is desired to fill the container as quickly as possible, introduction of the liquid is performed with the valve fully opened, which can result in excessive foaming. Further, a valve for filling a small can may cause foaming and/or excessive fill times when used for filling a large can and vice versa. This causes lost product, or inaccurate filling, or lost production due to change-over from one valve to another to accommodate various containers. Other problems, including limitations to proper cleaning of such valves, and others, have been noted.

SUMMARY OF THE DISCLOSURE

One embodiment provides a filling valve for filling a container a valve body having a chamber, a nozzle assembly being connected to the chamber, the nozzle assembly comprising a nozzle comprising an outlet and a peripheral surface about a central axis, an expandable sealing member operably positioned around the peripheral surface without interruption for substantially preventing liquid from flowing into an area about the peripheral surface, and positioned above the outlet for sealably engaging a container, the seal being capable of being expanded by a pressurizing gas, a vent tube positioned vertically above the nozzle, at least one aperture in the nozzle assembly near the sealing member, and a fluid passageway operatively positioned for communicating pressurizing gas from the vent tube through the at least one aperture in the nozzle for expanding the sealing member.

In an embodiment, the filling valve comprises a valve body having a chamber, a nozzle connected to the valve body, a valve seat having at least one aperture connecting the valve body chamber with the nozzle, a valve stem adapted to operatively move between a valve open position and a valve closed position to control a flow of fluid through the at least one aperture, a vent tube positioned vertically above the nozzle comprising a vent seat therein, a rod operably positioned to selectively close the vent seat blocking the flow of gas through the vent tube, a cap being vertically positioned above the valve stem and vent tube and selectively contacting the valve stem, the cap comprising an aperture, an end of the rod extending there though, a valve cam being positioned above the cap, the valve cam comprising a bearing surface adapted to push the rod axially downward to close the vent seat and the cap and valve stem axially downward into the valve closed position, the valve cam further comprising a groove through a portion of the bearing surface positioned for the end of the rod to operably move upward into the groove opening the vent seat while the valve stem is in the valve closed position when the valve cam rotates on the cap.

DETAILED DESCRIPTION OF THE DRAWINGS

Figure 1:
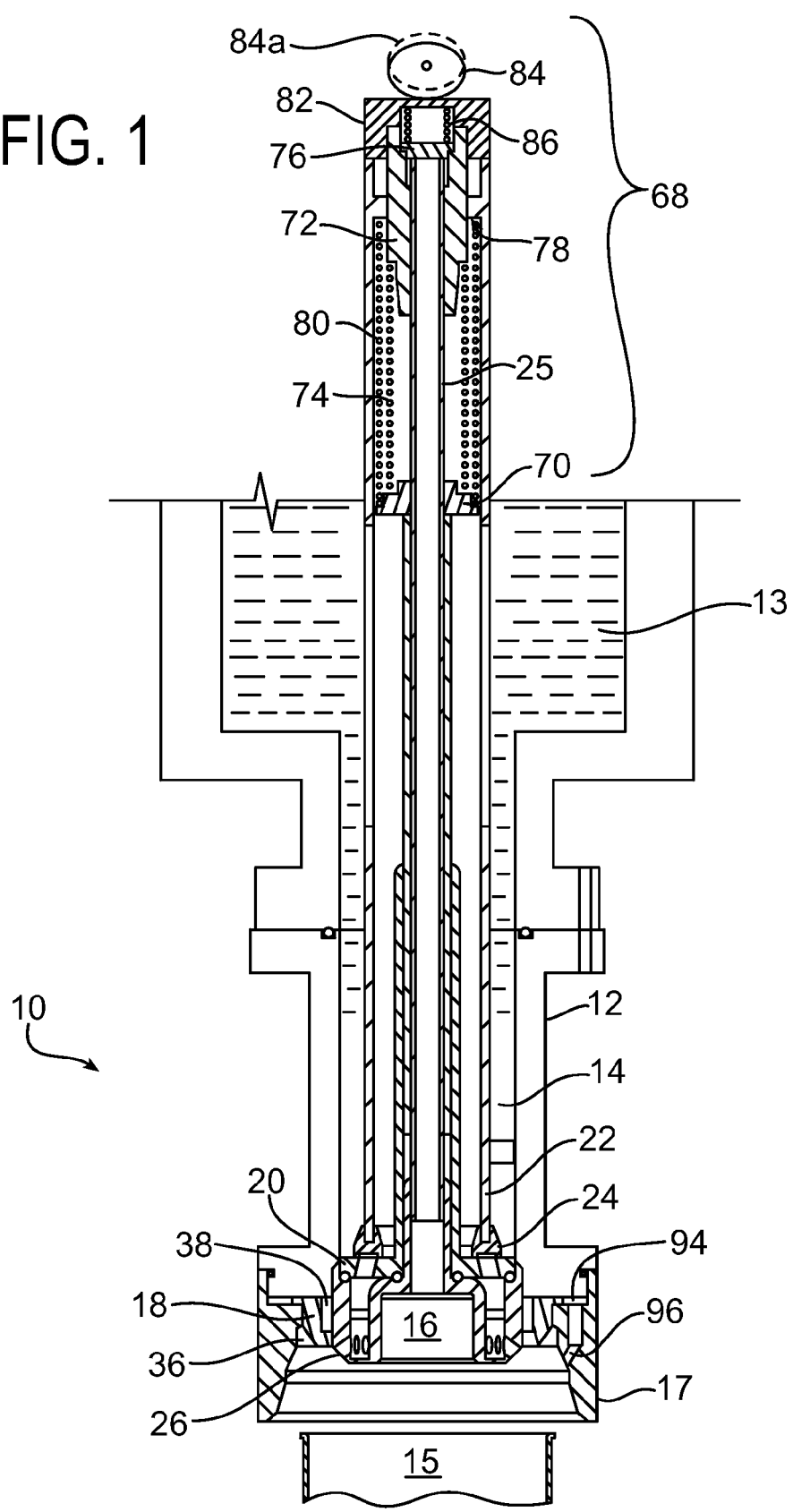
FIG. 1 is a partial cross sectional view through one embodiment of the filling valve.

The disclosure is directed to a filling valve which is generally functionally related to filling valves in widely used and long known filling machines, including but not limited to filling machines known as Crown filler machines. Turning to FIG. 1, the filling valve 10 is characterized by a generally cylindrical valve body, or housing 12, positioned with a reservoir 13 so that a liquid beverage or other fluid will selectively flow therethrough from the filling machine bowl or reservoir 13, through a nozzle assembly comprising a valve sealing seat 20 and dispensing nozzle 16, to be dispensed into a beverage can or other container 15. The filling valve embodiment of FIG. 1 further comprises a bell 17 surrounding the dispensing nozzle 16 adjacent to container sealing member 18. A valve actuation system includes the valve seat 20, a valve stem 22, and a closure valve 24, cooperating to selectively operate the filling valve 10 between a valve-open position and a valve-closed position. In the embodiment of FIG. 1, a vent tube 25 is connected to the nozzle 16 and positioned within the valve stem 22. The vent tube 25 may be of a screw in type to be selectively screwed into engagement with the nozzle 16 or otherwise suitably attached. The filling valve 10 may operate between the valve-closed and valve-open positions by the operation of an actuating assembly, generally indicated 68, which is capable of selectively opening the vent tube 25 and lifting the valve stem 22 for selective opening and closing of the valve 10.

The filling nozzle 16 is positioned at an operative end of the filling valve for directing fluid into the container 15. In one embodiment, the container is presented so that a mouth or opening on the container is beneath the nozzle 16. A container nest or conveying apparatus may lift the container into a filling position. Alternatively, the filling valve may move into the filling position. Methods and devices for presenting an empty container, such as but not limited to a can, to a filling valve are generally known in the art.

In one embodiment, the filling valve 10 is arranged in a vertical axial orientation with the chamber 14 being cylindrical about a centerline axis. In the embodiment of FIG. 1, the reservoir 13 is positioned vertically above the housing 12 such that the reservoir 13 is in fluid communication with the chamber 14. In this embodiment, the valve stem 22 extends from within the housing 12 into the reservoir. In the embodiment of FIG. 1, fluid contained by the reservoir 13 flows from the reservoir into the valve body chamber 14 and into the valve stem 22 by the force of gravity. In alternate embodiments, the chamber 14 may not be cylindrical, and it is contemplated that the valve 10 and/or chamber 14 may be angled or oriented in other non-vertical positions.

In one counterpressure filling embodiment, the reservoir 13 contains fluid and a pressurizing gas above the fluid, or in the head space of the reservoir 13. In this embodiment, shown in FIG. 1, the vent tube 25 extends above the fluid level into the pressurizing gas. The pressurizing gas may selectively flow through the vent tube 25 and into the container, causing the container 15 and the reservoir 13 to be substantially at the same internal pressure above 1 atmosphere during the filling process, discussed below.

Figure 2:
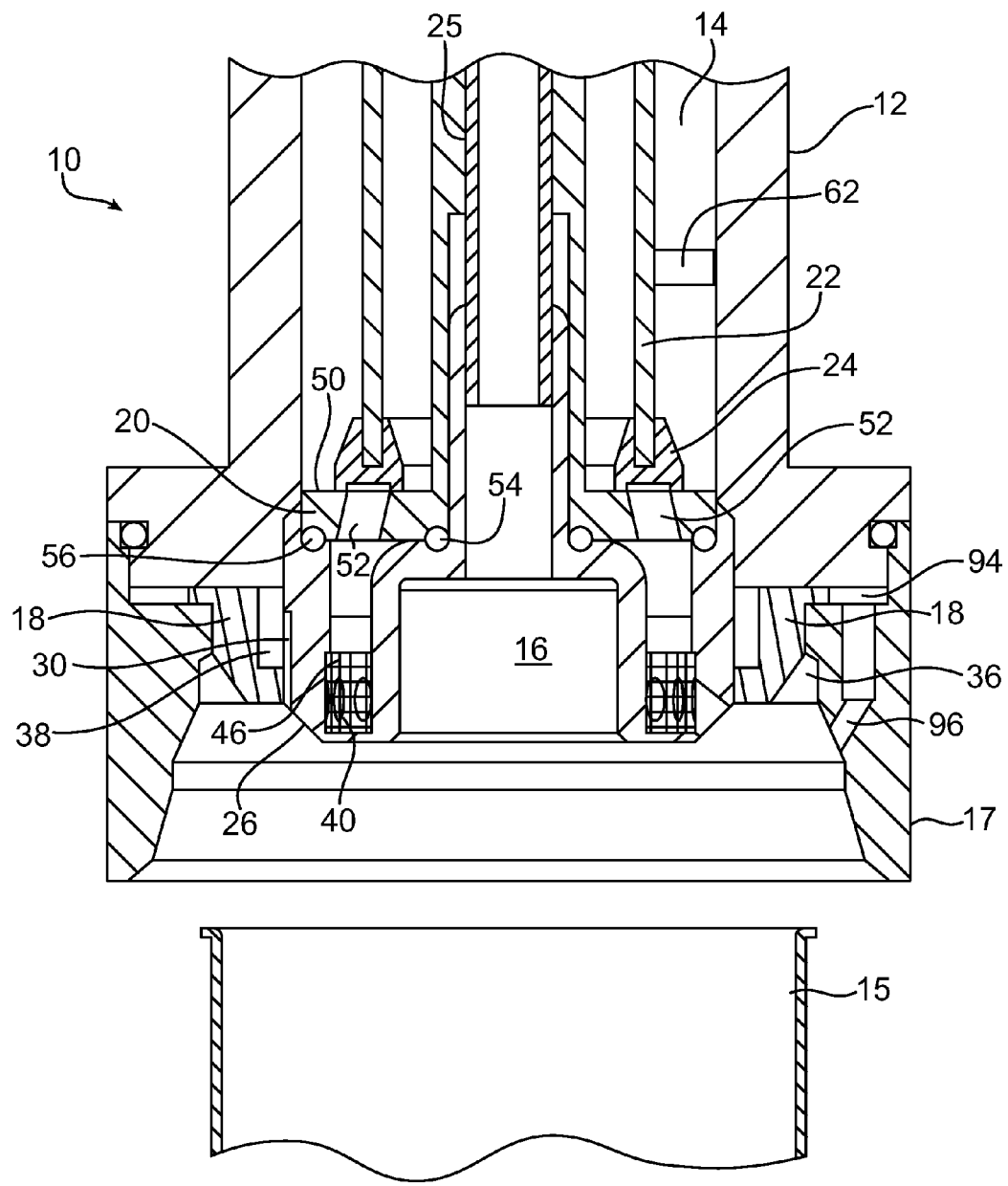
FIG. 2 is a partial cross sectional view through one embodiment of the filling valve.
Figure 3:
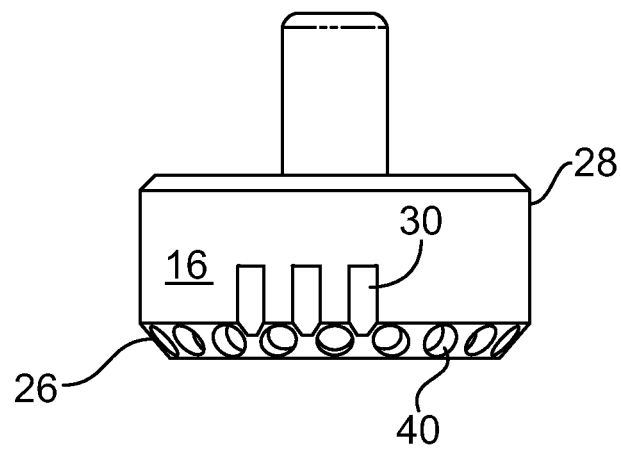
FIG. 3 is a side view of an embodiment of a nozzle for a filling valve.

As shown in FIG. 2, the dispensing nozzle 16 may include at least one dispensing outlet 26 and a peripheral surface 28 about a central axis. As shown in FIG. 2, the nozzle peripheral surface 28 has a cylindrical shape. In this embodiment, the sealing member 18 is operably positioned around the peripheral surface 28 in close relationship and without interruption. Previously, a sealing member at this location included discontinuities to allow gas to pass through the space adjacent surface 28. As shown in the embodiment of FIGS. 2 and 3, the peripheral surface 28 may include one or more grooves 30 extending under the sealing member 18. Alternatively, one or more apertures may be used to allow pressurizing of the sealing member 18 as discussed below, while the close positioning of the sealing member about the surface 28 prevents the ingress of liquid to a position behind the sealing member 18.

In one automated container filling system, the containers and filling valves are positioned on a rotating table. In the rotary filling system, the grooves 30, if present, may be positioned such that the grooves are oriented toward the center of the rotating table. In a rotary filling system, as the fluid is dispensed, centrifugal force lifts the fluid up the inner container surfaces oriented to the outside of the rotating table. By positioning the grooves 30 toward the inside of the rotating table, the centrifugally forced liquid does not enter the grooves 30. If apertures or the like are provided to pressurize the sealing member 18, they similarly may be positioned toward the inside of the rotating table so the centrifugally forced fluid may not enter the apertures.

Figure 4:
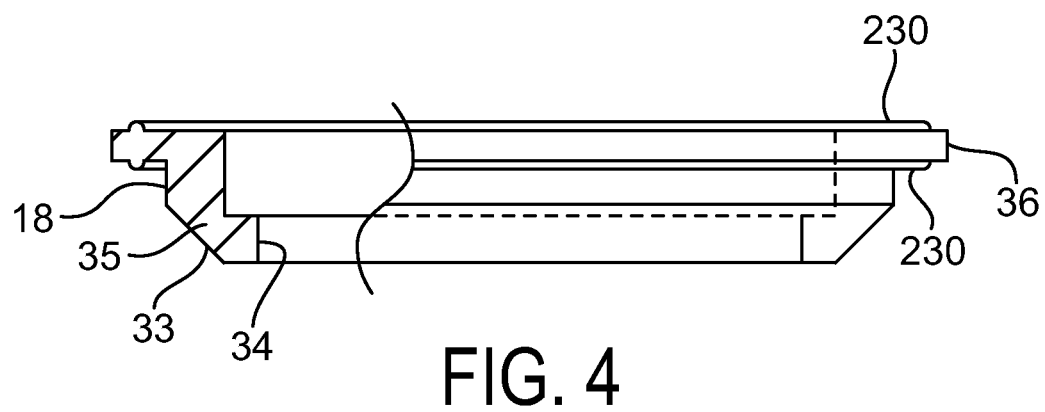
FIG. 4 is a partial sectional view through a side view of an embodiment of a seal member for a filling valve.

The sealing member 18 shown in FIG. 4, has a substantially uniform cross section, and is positioned such that when the seal 18 is installed on the nozzle surface, the seal 18 has a sealing portion 33 in close proximity to the nozzle peripheral surface 28 to substantially prevent flow of any liquids past the seal. The discontinuities in past sealing members enabled liquid to flow past and into a space 38 as shown in FIG. 2. The configuration of the seal 18 prevents migration and retention of such liquid to the space or cavity 38, which may otherwise be subsequently improperly released to result in waste of any retained product. In this embodiment, the seal 18 does not include any notches or other structures to allow flow of pressurizing gasses as in the prior art, but instead seals against the surface 28 as described. The sealing member 18 comprises a container sealing surface 34, and a mounting flange 36. The seal has a size for sealably engaging the inner walls of the container. In this embodiment, the seal 18 comprises a flexible and resilient material suitable for preventing pressurized liquid from passing between the seal 18 and the inner top surface of the container.

Figure 5:
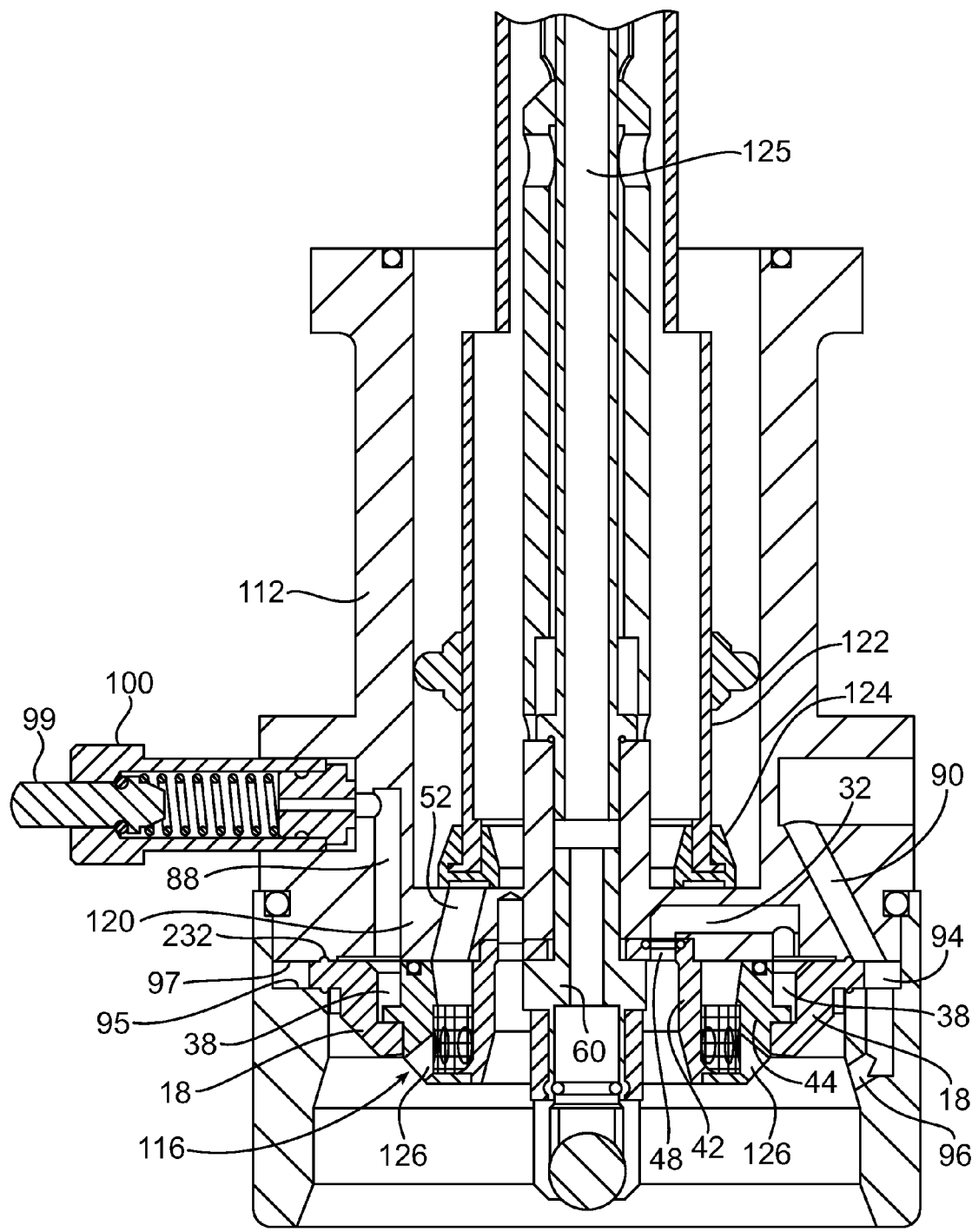
FIG. 5 is a partial cross sectional view through an alternative filling valve, FIGS. 6A and 6B provide end views of a nozzle with dispensing outlets formed therein, FIGS. 7A and 7B provide top and sectional views of an embodiment of a valve seal for a filling valve, FIGS. 8A and 8B provide top and partial sectional views of one embodiment of a valve closure seal for a filling valve.

The seal 18 may be made from a flexible and resilient material such as, but not limited to, a thermoplastic elastomer or rubber. The seal 18 comprises a shape such that at least a portion of the seal, an expanding portion 35, flexes or expands when the space behind the seal, or the seal cavity 38, is filled with pressurizing gas, causing further engagement of the container sealing surface 34 with the inner walls of the container. Thus, the seal is capable of sealing against the container when in the expanded or flexed position, thereby sealing the nozzle in the mouth or opening of the empty container and holding the pressurizing gas in the container at a selected pressure. When the pressurizing gas in the seal cavity 38 is released, the seal returns to its original shape and position. As shown in FIGS. 2 and 5, the expanding portion 35 may be adapted to define with a portion of the nozzle assembly the gas passageway 38 adapted to deliver the pressurizing gas.

As shown in FIGS. 2 and 4, the seal 18 may be mounted by capturing the flange 36 between the valve body 12 and the bell 17. Optionally, the seal 18 may include one or more protrusions 230 extending from an upper surface of the flange 36, a lower surface of the flange, or a combination thereof as shown in FIG. 4. If provided, the protrusion 230 may be positioned in a corresponding groove 232 provided in the valve body and/or bell as shown in FIG. 5. The protrusion 230 and corresponding groove 232 may be provided to lock the flange 36 in place and resist movement of the flange when the seal is in operation, as well as to act as an integral o-ring type of seal that prevents the loss of the liquid contents during the filling operation. As shown in FIGS. 4 and 5, the protrusions 230 and corresponding grooves 232 may be semi-circular in cross-sectional shape, and may extend annularly around the seal 18. Alternatively, the protrusions 230 and corresponding grooves 232 may have any cross-sectional shape as desired, such as polygonal, arcuate, or other shape. Alternatively or additionally, the protrusions 230 and corresponding grooves 232 may be continuous or discontinuous annularly around the flange 36. Alternatively or additionally, the protrusions 230 and corresponding grooves 232 may be positioned radially around the flange 36, or in other arrangements as desired.

With reference to FIGS. 2 and 5, the empty container 15 may be lifted into a filling position having a sealing engagement with the seal 18 sufficient to hold the pressurizing gas in the container. When the empty container is provided in the filling position in sealing engagement with the seal 18, the pressurizing gas flows through the vent tube 25 and into the container 15 such that the pressure in the container may be substantially the same as the pressure in the reservoir 13. From the container 15, the pressurizing gas passes through the grooves 30 under the seal 18, in the embodiment of FIG. 2, filling the seal cavity 38 and causing the seal to flex or expand into further engagement of the container sealing surface 34 with the top interior walls of the container. Alternatively, in the embodiment of FIG. 5, the pressurizing gas from the vent tube 25 flows through an aperture 32 in the nozzle assembly filling the seal cavity 38 and causing the seal to flex or expand into further engagement of the container sealing surface 34 with the top interior walls of the container. The expanded seal 18 provides sufficient engagement with the container to allow additional pressurizing gas to be released into the container to achieve a pressure inside the container greater than 1 atmosphere. After the container is pressurized to substantially the same pressure as the pressure in the reservoir 13, liquid from the reservoir flows into the container 15 by way of the nozzle outlet(s) 26.

Figure 6A:
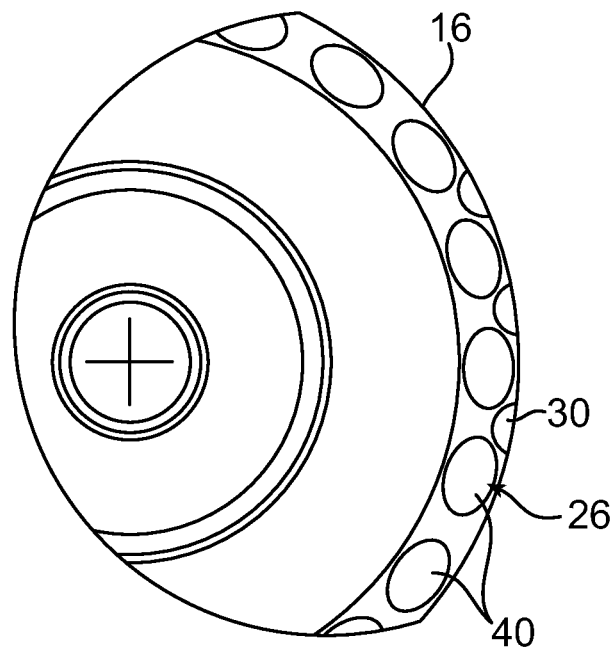
Figure 6B:
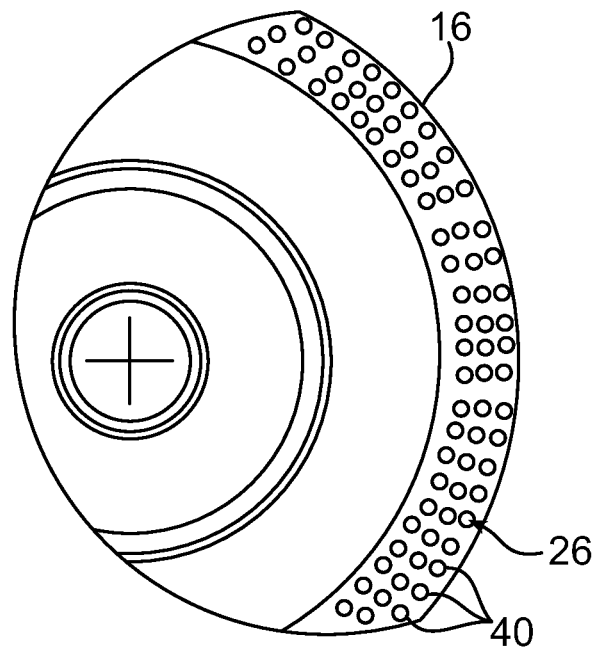

In one embodiment with reference to FIGS. 6A and 6B, the at least one nozzle outlet 26 may comprise a plurality of ports 40. The ports 40 comprise openings substantially level with an outer surface of the nozzle 16, and directional passageways in the nozzle. The directional passageways have inlets that are selectively in communication with the valve body chamber 14. In one embodiment, the ports 40 dispense fluid in a laminar flow. The passageways of the ports 40 may be oriented to dispense fluid in a downwardly direction defined by an outward angle, and possibly a tilt angle. The nozzle ports 40 may direct fluid in a direction having only an outward angle, only a tilt angle, or a combination of outward and tilt angles.

In one embodiment, the outward angle may be defined as an angle from a transverse plane perpendicular to the central axis of the nozzle 16. The outward angle may be provided for directing fluid against an inner wall of the container 15 during the filling operation. In one embodiment, the outward angle is within a range of approximately 30° to 70° from the transverse plane. In another embodiment, the outward angle is approximately 50° from the transverse plane. The outward angle may be selected to cooperate with the container being filled to decrease the amount of turbulent flow and increase the amount of laminar flow. Some containers, such as certain beverage cans, may have a lip or ridge near the mouth of the container. When filling containers with a lip or ridge, the outward angle may be selected to direct the flow of fluid against the inner wall of the container at a location beneath the lip or ridge.

The tilt angle may be defined as an angle from a radial plane parallel to the central axis of the nozzle 16. The tilt angle may be provided for directing fluid in a swirling direction during the filling operation of a cylindrical, spherical, or otherwise rounded container. In one embodiment, the tilt angle is within a range of approximately 10° to 40° from the radial plane. In an alternate embodiment, the tilt angle is approximately 20° from the radial plane. It is contemplated that the tilt angle may be selected to cooperate with the container being filled to decrease the amount of turbulent flow and increase the amount of laminar flow. The ability to provide laminar flow directed in a predetermined manner for any particular container 15 allows for faster fill times without having the liquid escape from the container due to the centrifugal force of a rotary filler for example.

In the nozzle embodiment as shown in FIG. 6A, the outlet 26 may comprise a number of ports 40 arranged around the nozzle, each port opening having a predetermined diameter, with a predetermined number of ports 40 provided. Depending on the filling requirements, the number of ports 40 is designed to enable a volume of liquid to pass therethrough in a predetermined period of time. For example, the number or ports 40 may be between 15 and 25, and have a diameter of approximately 0.15 to 0.20 inches, such as shown in FIG. 6A, or for example may comprise between 35 and 45 ports, each having an opening diameter of approximately 0.08 to 0.15 inches. Other nozzle embodiments are contemplated, such as having a larger number of ports 40, such as between 120 to 150, each having a port opening diameter, such as between 0.002 to 0.006 inches, such as shown in FIG. 6B. In a further embodiment, one port having an outward angle, and optionally a tilt angle, may be used. It is contemplated that the nozzle 16 may comprise any suitable number of ports for dispensing fluid into the container.

The configuration of ports 40 may be chosen with a balance of number of ports 40 relative to the diameter, to provide volume flow balanced with capillary action by the port size for reducing the flow of fluid from the ports when the valve is in the valve-closed position. Configurations allow for much faster fill times, up to 0.4 seconds faster than conventional systems. Thus, in one embodiment, the number of ports 40 is determined by considering the overall flow rate of fluid through the nozzle 16 compared to the amount of fluid that continues to flow from the ports after the filling valve is closed.

A screen 46 may be positioned between the valve body chamber 14 and the outlet 26. In the embodiment of FIG. 2, the screen 46 is vertically positioned inside the nozzle to cover the passageway inlets of the ports 40. By positioning the screen inside the nozzle 16, the screen 46 is generally protected from ambient air, and thus is maintained in the relatively acidic environment of the liquid and maintains cleanliness of the screen 46. In the embodiment of FIG. 2, the screen comprises a substantially cylindrical shape, positioned coaxially within the nozzle. In one embodiment, the screen is between 20 and 40 mesh. It is contemplated that the screen configuration may have a mesh size larger or smaller to accommodate the liquid being dispensed. The screen 46 may provide surface tension characteristics to restrict gas passage from the container 15 to the reservoir 13 when the filling cycle is complete but the valve is still open, and facilitates preventing flow of any liquid through the ports 40 when the valve is in the valve-closed position. The position of the screen 46 is also as low in the valve 10 as possible, and almost at the height of liquid in a container upon filling. This positioning provides less delay at the end of a fill cycle when a ball valve (not shown) seats in the vent tube as the liquid height reaches the fill height. Upon seating of a ball valve in association with the vent tube to stop flow of liquid, the position of the screen 46 eliminates any waiting for the last of the liquid product to run down into the container 15. This positioning also allows for a closer tolerance on the actual fill height of the container.

Figure 7A:
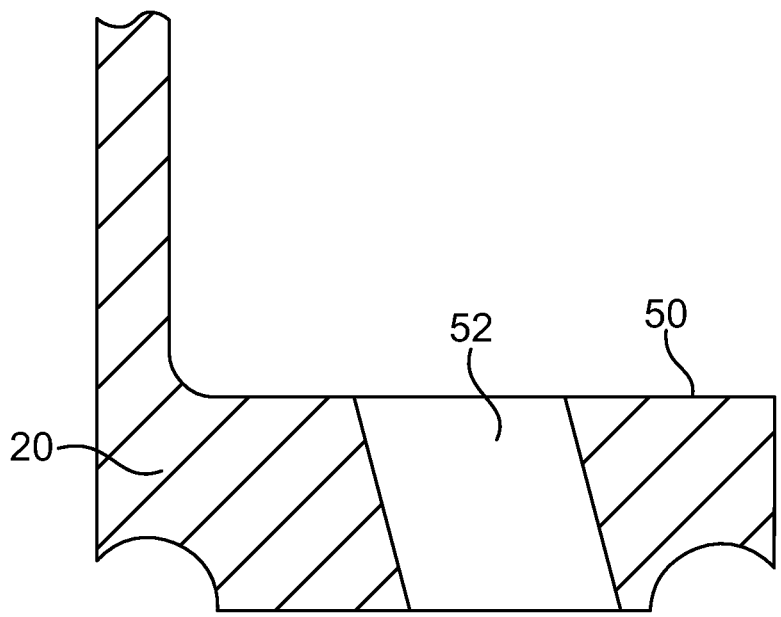
Figure 7B:
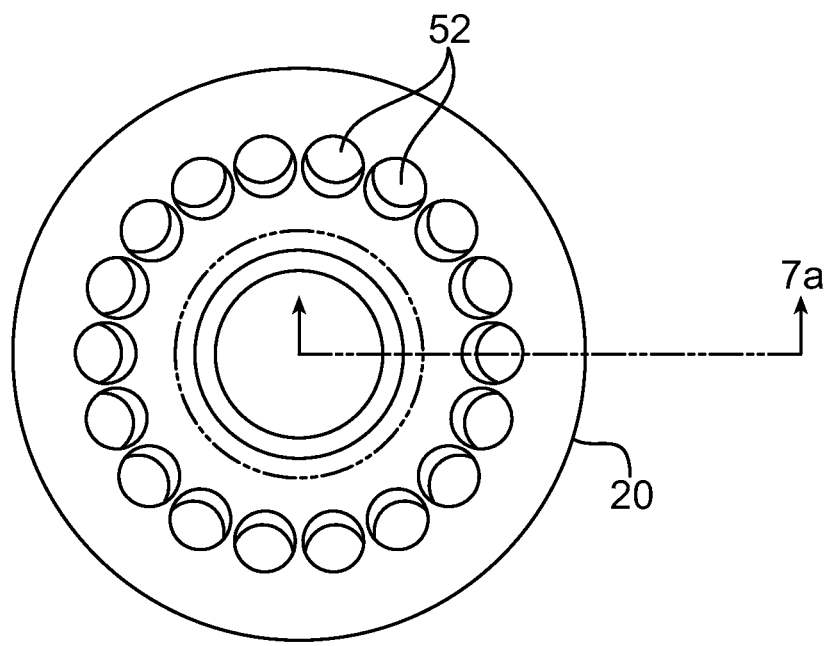

With reference to the nozzle assembly shown in FIG. 2, the nozzle 16 may be connected to the housing 12 by brazing. In this nozzle assembly, the valve seat 20 may be a replaceable valve seat 20, such as shown in FIGS. 7A and 7B. The valve seat 20 may comprise a substantially flat surface 50, and at least one filling aperture 52 through the valve seat 20 for connecting the valve body chamber 14 with the nozzle. In the embodiment of FIG. 7B, between 15 and 20 cylindrical apertures are used. In this embodiment, the filling apertures 52 pass through the valve seat 20 at an angle. In this embodiment, the valve seat 20 is selectively removable from the nozzle assembly for cleaning, maintenance, or to provide a valve seat having a different size and/or arrangement of filling apertures 52 providing fill characteristics as desired. As shown in FIG. 2, the valve seat 20 may be removably installed in the nozzle assembly with an inner o-ring 54 and an outer o-ring 56 to seal the valve seat 20 in association with the nozzle 16. Alternatively, the valve seat may be integrated into the housing 12 as shown in FIG. 5. It is contemplated that the shape of the filling apertures 52 through the valve seat 20 may be cylindrical or slots or other shapes as desired. In an alternative embodiment, the valve seat comprises one or more conical surfaces comprising apertures. The ability to exchange the valve seat 20 may therefore allow the valve 10 to be reconfigured for different sized containers for example, such as smaller cans. The valve 10 may have the body reconfigured with a smaller nozzle to accommodate a smaller container 15, with the liquid seat 20 still fitting for use therewith.

Referring now to the nozzle assembly shown in FIG. 5, an alternative nozzle 116 having a nozzle outlet 126 is shown with a fixed valve seat 120. In the nozzle assembly of FIG. 5, the valve seat 120 is brazed into the housing 112 and the nozzle 116 may removable from the valve seat 120 for cleaning, maintenance, or to provide an outlet 126 having a different size and/or arrangement of ports 40 providing fill characteristics as desired. Alternatively or additionally, the nozzle 116 may be removable for removing or replacing the screen 46. The nozzle 116 may be assembled from two or more parts. As shown in FIG. 5, the nozzle 116 may comprise a nozzle inner portion 42 and a nozzle outer portion 44 forming a passageway therebetween in communication with the filling apertures 52 through the valve seat 120. The nozzle 116 may be connected to the valve seat 120 by a threaded ball cage housing 60 as shown in FIG. 5. At least one o-ring may be provided in the nozzle assembly between the nozzle 116 and the valve seat 120.

The aperture 32 may be provided in the valve seat 120 near the sealing member 18 positioned between two or more filling apertures 52. An inlet 48 to the aperture 32 may be provided through an upper portion of the nozzle 116 as shown in FIG. 5. A fluid passageway comprising the seal cavity 38 may be operatively positioned in communication with aperture 32 for communicating pressurizing gas from the vent tube 25 through the aperture 32 into the seal cavity 38 for expanding the sealing member 18. A snift valve 100, such as shown in FIG. 5, is provided in communication with the seal cavity 38 and the aperture 32 to release the pressurizing gas from the seal cavity 38 and the container thereby causing the seal to deflate disengaging the top interior walls of the container.

In the embodiment of FIG. 5, the sealing member 18 is operably positioned around the peripheral surface of the nozzle 116 in close relationship and without interruption. As discussed above, previously a sealing member at this location included discontinuities to allow gas to pass through, but enabled fluid from the container to pass through the discontinuities about the seal and mix with pressurizing gas releasing through the snift valve, causing product loss and ongoing maintenance caused by the spray of fluid through the snift. As it is desired to avoid fluid loss through the snift valve, in the embodiment of FIG. 5 the aperture inlet 48 is positioned away from the fluid in the container 15 to reduce fluid entering the aperture 32. The aperture inlet 48 is positioned inside the nozzle 116, and may be higher than the sealing member 18 as shown in FIG. 5, without interrupting the seal between the nozzle 116 and the sealing member 18, compared to the embodiment of FIG. 2, where the grooves 30 provide gas passage beneath the seal.

The nozzle assembly of FIG. 5 includes a valve actuation system including the valve seat 120, a valve stem 122, and a closure valve 124, cooperating to selectively operate the filling valve between a valve-open position and a valve-closed position. In the embodiment of FIG. 5, a vent tube 125 is connected to the nozzle 116 and positioned within the valve stem 122. The vent tube 125 may be of a screw in type to be selectively screwed into engagement with the nozzle 116 or otherwise suitably attached. The filling valve may operate between the valve-closed and valve-open positions by the operation of an actuating assembly, discussed below.

Figure 8A:
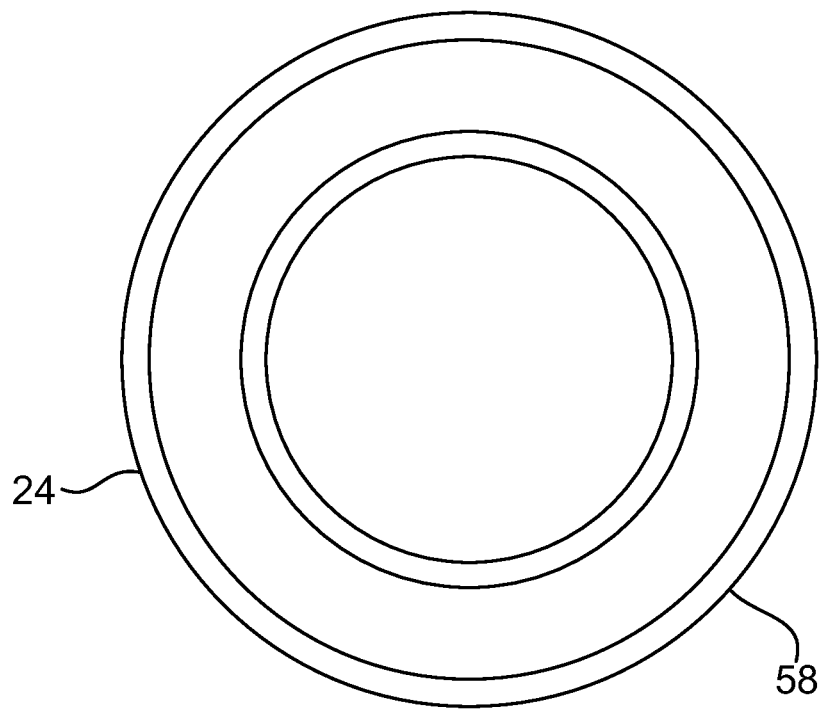
Figure 8B:
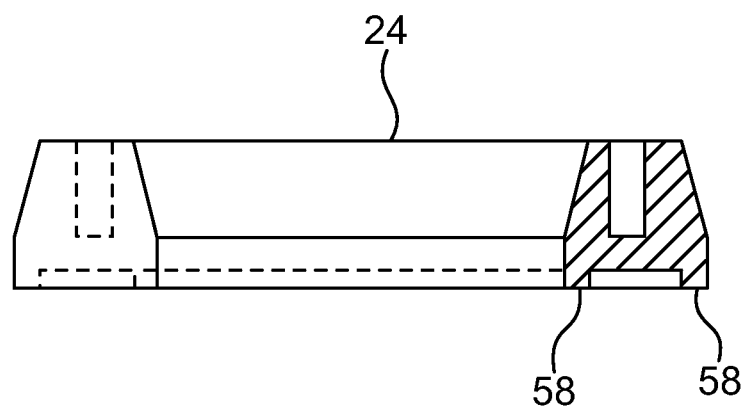

As shown in FIG. 2 and FIGS. 8A and 8B, the closure valve 24 is configured to control the flow of fluid through the at least one aperture 52. The closure valve 24 may be configured to close the at least one apertures 52 when the filling valve 10 is in the valve-closed position. In one embodiment, the closure valve 24 engages the flat surface 50. In the embodiment of FIGS. 8A and 8B, the closure valve 24 comprises one or more protrusions 58 for sealing against the flat surface 50. In this embodiment, the bosses 58 encircle the apertures 52. One or more bosses 58 may encircle one or more apertures 52. Alternately, bosses 58 may be configured to enter the apertures 52 in sealing engagement. The closure valve 24 may comprise a flexible and resilient material suitable for preventing pressurized liquid from passing between the closure valve 24 and the valve seat surface 50. Providing the seat surface 50 as a flat surface allows for proper sealing without undue engagement of the seating surface 50 with the closure valve 24 allows for faster filling without possible short fills due to sticking of the closure valve 24 upon filling.

Figure 9:
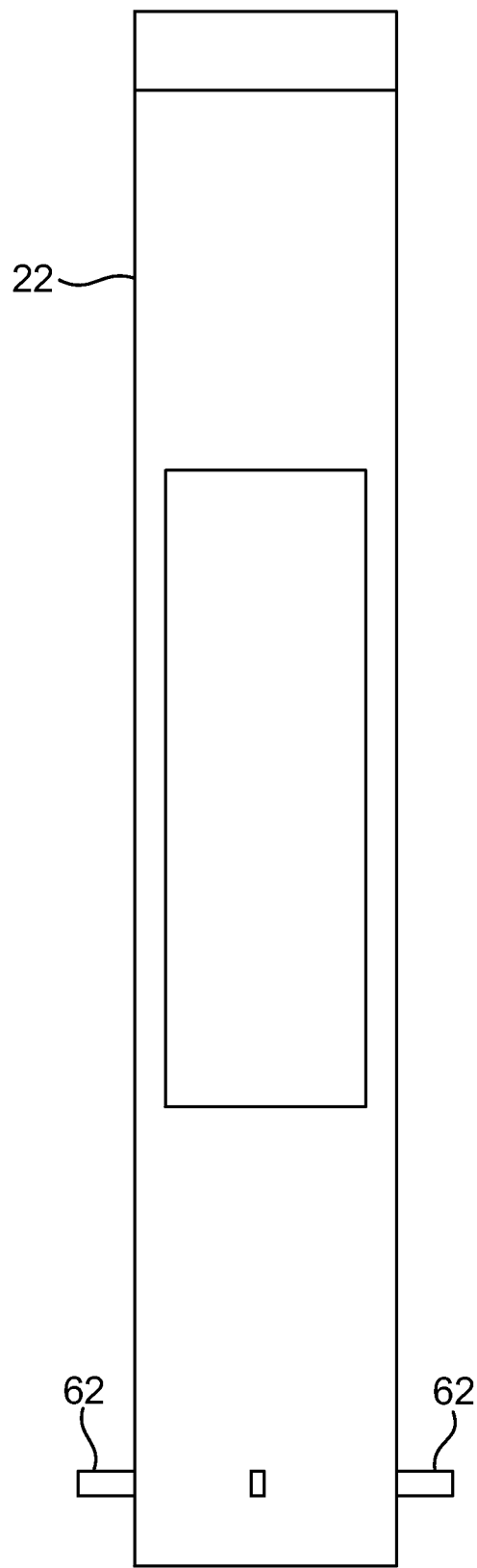
FIG. 9 is a side view of one embodiment of a valve stem for a filling valve.

The closure valve 24 is affixed to the valve stem 22 to allow opening and closing of the valve. As seen in FIG. 9, the valve stem 22 may comprise at least one boss 62 for guiding the stem 22 in the valve body chamber 14. In the embodiment of FIG. 9, the valve stem comprises a plurality of bosses 62 situated at 90 degree spacing around the stem 22. The bosses 62 may be integrally formed or separately attached. Other configurations to center the stem 22 without undue restriction to the movement of stem 22 are contemplated.

The filling valve of FIG. 1 further comprises the actuating assembly 68 capable of selectively moving the valve stem 22 and closure valve 24 between the valve open and valve closed position. In one filling valve embodiment, the actuating assembly 68 lifts up to move the valve stem 22 and closure valve 24 into the valve-open position, and presses down to move the valve stem 22 and closure valve 24 into the valve-closed position.

Figure 10:
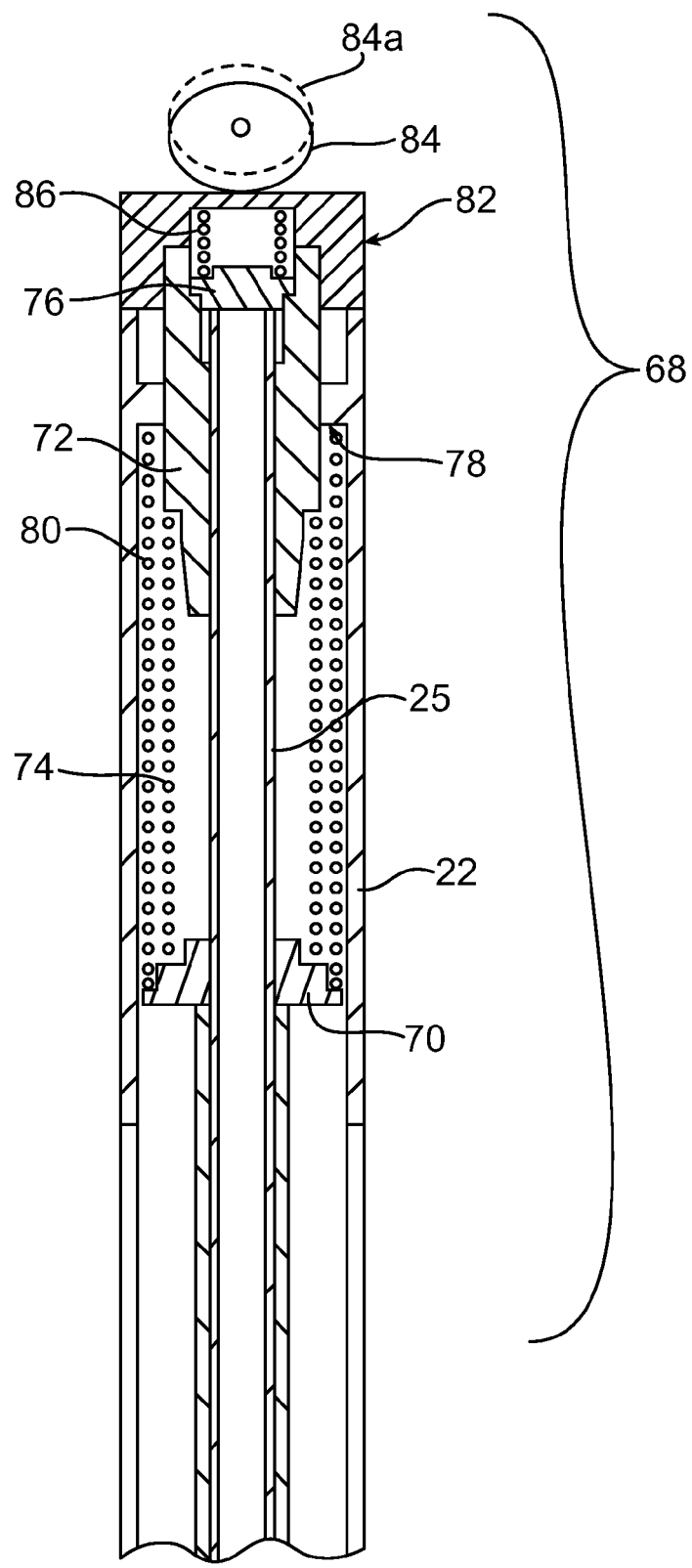
FIG. 10 is a partial cross sectional view of an embodiment of an actuating system for a filling valve.

As seen in FIG. 10, the actuating assembly 68 comprises an arrangement of systems and associated spring biasing members to allow for selected movement from and back to initial positions between valve open and closed conditions. Situated within the upper portion of the valve assembly, a counter pressure cap and assembly is provided, along with a valve seal actuating assembly. These assemblies allow for actuation of the valve operations in a desired sequence. A lower spring seat 70, an upper spring seat 72, and a pressure spring 74 are operably positioned between the lower spring seat 70 and the upper spring seat 72. In this embodiment, the lower spring seat 70 is positioned within the valve stem 22, and is in a fixed position relative to the valve seat 20 and the vent tube 25. The upper spring seat 72 may be positioned within the valve stem 22 above the lower spring seat 70, capable of translating in an axial direction adjacent to the vent tube 25. A vent seal 76 is operably positioned at the end of the vent tube 25 and capable of sealing the vent tube. The upper spring seat 72 and the vent seal 76 cooperate such that when the upper spring seat 72 translates axially upward, the upper spring seat 72 causes the vent seal 76 to disengage and thereby open the vent tube 25.

In this embodiment, the valve stem 22 comprises a stem spring seat 78 located within the valve stem and vertically positioned above the lower spring seat 70. A valve spring 80 is operably positioned between the lower spring seat 70 and the stem spring seat 78.

The actuating assembly 68 further comprises a cap 82 positioned above the valve stem 22, and a valve cam 84 capable of controlling the height of the cap 82. In one embodiment, the cap 82 translates axially up and down between an upper and a lower position, floating against the operatively moving valve cam 84, the cam being shown in an upper position 84a in FIG. 1. In this embodiment, the valve cam 84 provides a downward force on the cap 82 when moving to the lower position. As the cap 82 moves to the lower position, the cap pushes the upper spring seat 72 downward, thus compressing the pressure spring 74. When the valve cam 84 moves to the upper position, the pressure spring 74 presses the upper spring seat 72 against the cap 82, causing the upper spring seat 72 and the cap to translate upward with the valve cam 84.

The cap 82 may further be capable of pressing the vent seal 76 against the vent tube 25 when the cap 82 is in the lower position. In one embodiment, the cap 82 and the vent seal 76 are combined into one part.

In one embodiment, the vent seal is spring actuated, with a vent spring 86 operably positioned between the vent seal 76 and the cap 82 such that when the cap moves to the lowered position, the vent spring 86 presses the vent seal 76 against the vent tube 25 in sealing engagement. The vent spring 86 may be positioned to accommodate over-travel of the valve cam 84, for reducing or preventing damage of the vent seal 76, and vent tube 25. In this embodiment, the cam 84 may be set such that moving the cam to the cam lower position moves the closure valve 24 and valve stem 22 to close the valve seat 20. If in closing the valve seat 20 the cam 84 presses down farther than the distance required to close the vent tube 25, the vent spring 86 may absorb the excess travel of the cap 82 and cam.

In this embodiment, the cap 82 and the upper spring seat 72 cooperate such that when the cap moves to a lowered position, the cap causes the upper spring seat 72 to translate axially downward. Further, when the cap 82 is in the lowered position, the cap holds the valve stem 22 and correspondingly the stem spring seat 78 such that the valve seat 20 is closed and the valve spring is compressed. Thus, when the cap is in the lowered position, the cap causes the pressure spring 74, the valve spring 80, and the vent spring 86 to be compressed, the vent tube 25 being sealed by the vent seal 76, and the valve seat 20 being closed by the closure valve 24. Thus, when the valve cam 84 and cap 82 are in the lowered position, the filling valve 10 is in the valve-closed position.

When the valve cam 84 moves to the raised position, the compressed pressure spring 74 expands, lifting the upper spring seat 72. In this embodiment, the moving upper spring seat 72 pushes the cap 82 and the vent seal 76 axially upward, causing the vent seal 76 to disengage, thereby opening the vent tube 25. When the valve cam 84 moves to the open position 84a, the compressed pressure spring 74 causes the upper spring seat 72 to disengage the vent seal 76 from the vent tube 25. As described previously, the reservoir 13 may contain fluid and a pressurizing gas above the fluid. When the vent seal 76 disengages from the vent tube 25, the pressurizing gas in the head space of the reservoir flows through the vent tube and into the container. Once the pressure in the container substantially equals to the pressure in the reservoir 13, the compressed valve spring 80 overcomes the pressure in the reservoir holding the valve stem 22 and closure valve 24 against the valve seat 20, causing the valve stem 22 and closure valve 24 to lift, thereby opening the valve seat. Fluid then flows into the container. Thus, when the valve cam 84 moves to the open position 84a, the filling valve moves to the valve-open position.

As the fluid level rises in the container, the pressurizing gas in the container is forced back through the vent tube 25 and into the reservoir 13. When the container is filled to a desired level with fluid, pressurizing gas remains in the container above the fluid. The valve cam 84 then moves to the lowered position, pressing the cap 82 down causing the valve to close. The snift valve 100, such as shown in FIG. 5, is actuated causing the pressurizing gas in the container to vent, returning the container to atmospheric pressure. The head space in housing 12 where gas remains after filling is reduced such that the volume of gas required to be snifted is smaller, thereby allowing faster operation.

In an alternative embodiment, the filling valve may provide a variable flow rate through the valve as desired as the valve operates between the valve-closed and valve-open positions. An actuating assembly 168 may provide, for example, a restricted flow when the valve first opens, then full flow after the fluid begins to enter the container 15.

Figure 11:
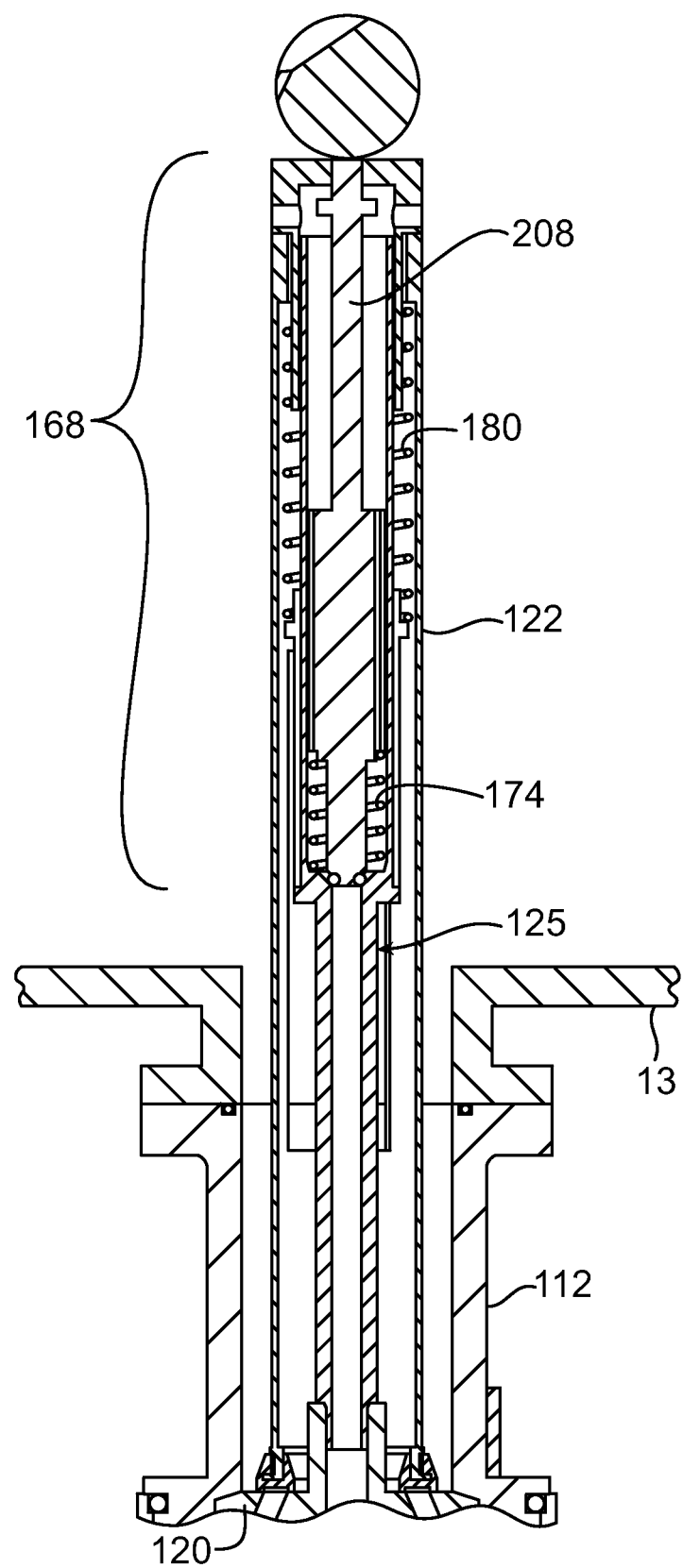
FIG. 11 is a partial cross sectional view through an alternative embodiment of the filling valve.
Figure 12:
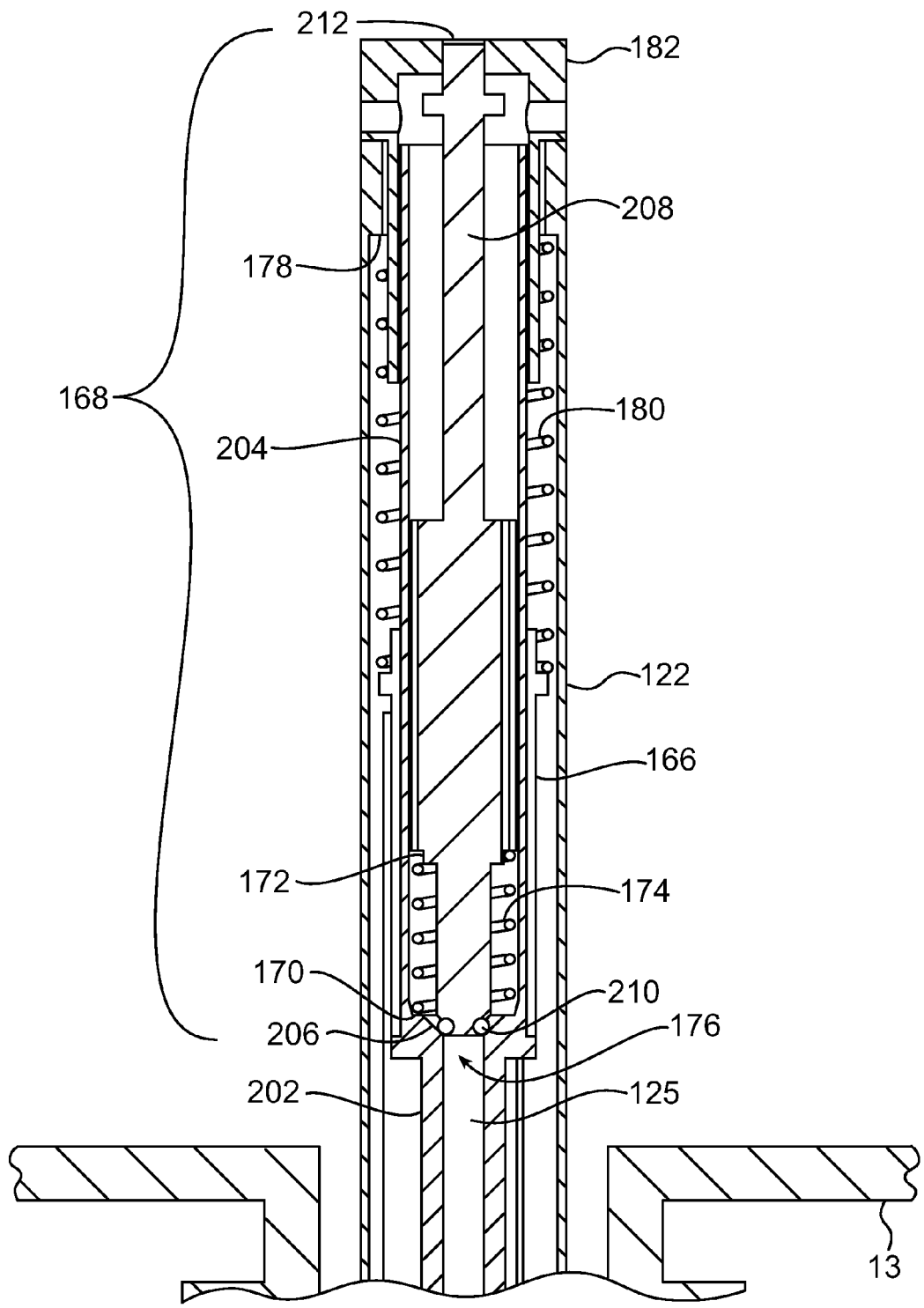
FIG. 12 is a partial cross sectional view of an alternative embodiment of an actuating system for a filling valve.

Referring now to FIGS. 11 and 12, the actuating assembly 168 comprises an arrangement of systems and associated spring biasing members to allow for variable movement between valve closed and valve open conditions as desired. In this configuration, a vent tube 125 may comprise a tube portion 202 and a pressure valve portion 204 with a vent seating surface 206 therebetween. A vent seal 176 operatively engages and disengages the vent seating surface 206 to selectively close or open the flow of gas through the vent tube. The vent tube 125 extends from the nozzle 16, 116 to the head space above the fluid in the reservoir 13, such that when the vent seal 176 disengages from the vent seating surface 206, the pressurizing gas in the head space of the reservoir flows through the vent tube 125 and into the container. The actuating assembly 168 may include the pressure valve portion 204 as shown in FIG. 12.

In this embodiment, the vent tube 125 is axially positioned with the valve stem 122. The valve stem 122 may comprise a stem spring seat 178 located within the valve stem. A valve spring seat 166 may be provided around the pressure valve portion 204 of the vent tube and vertically positioned beneath the stem spring seat 178. The valve spring seat 166 may be a sleeve or other part operatively positioned around the vent tube. Alternatively, the valve spring seat 166 may be integral with the vent tube 125. A valve spring 180 is operably positioned between the valve spring seat 166 and the stem spring seat 178.

Within the pressure valve portion 204 of the vent tube 125, the vent seal 176 may comprise a rod 208 and an o-ring 210 movable within the pressure valve portion 204 of the vent tube, the o-ring positioned to be capable of disengaging and engaging the vent seating surface 206 for selectively opening and closing the vent seal as the rod operatively moves within the vent tube 125. The vent tube 125 may comprise a lower spring seat 170 operably positioned around and/or adjacent the vent seating surface 206. The rod 208 may comprise a pressure spring seat 172, and a pressure spring 174 may be operably positioned between the lower spring seat 170 and the pressure spring seat 172. As shown in FIGS. 11 and 12, the lower spring seat 170 and the valve spring seat 166 are in a fixed position relative to the valve seat 120 and the vent tube 125. In the embodiment of FIGS. 11 and 12, the rod 208 and associated pressure spring seat 172 are capable of translating in an axial direction within to the vent tube 125 for opening and closing the vent seal 176.

Figure 13:
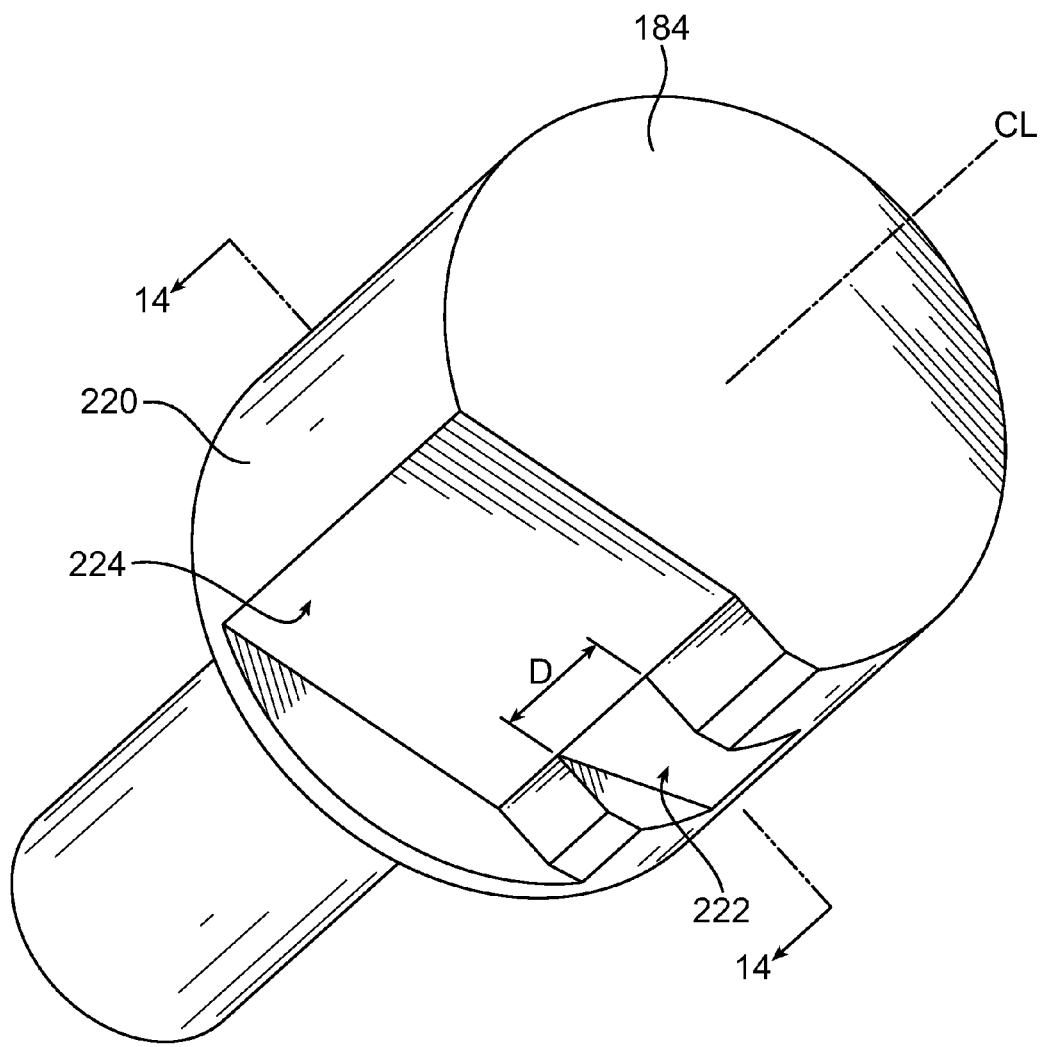
FIG. 13 is a perspective view of a cam for use with the actuating system of FIG. 12, FIGS. 14A through 14D are partial sectional views through the cam and actuating system illustrating an activation sequence of a filling valve, FIGS. 14AA, 14CC, and 14DD are partial sectional views through the valve seat, valve stem, and closure valve corresponding to the activation sequence of FIGS. 14A-14D.

The actuating assembly 168 further comprises a cap 182 positioned above the valve stem 122, and a valve cam 184 capable of controlling the height of the cap 182. The cap 182 comprises an aperture 212 with the end of the rod 208 extending there through, and the end of the rod selectively engaging the cam 184. As shown in FIG. 13, the cam 184 comprises a bearing surface 220, and may comprise a groove 222 cut into the bearing surface having a width greater than the size of the end of the rod 208, identified as "D" in FIG. 13, such that the end of the rod 208 may travel along the groove in operation. The groove 222 may be positioned centrally on the bearing surface 220 such as shown in FIG. 13. Alternatively, the groove 222 may be toward the front of the bearing surface, or toward the rear of the bearing surface. In any event, the groove 222 is positioned such that the end of the rod 208 travels within the groove as the cam 184 rotates. The cam 184 further comprises a recess 224 adjacent the groove 222 for configured for actuating the valve stem 122.

Figure 14A:
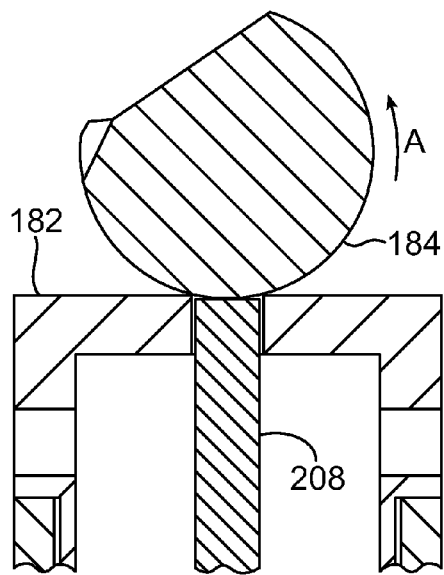

The cap 182 and valve stem 122 translate axially up and down between an upper and a lower position, floating against the operatively rotating valve cam 184. For example, FIGS. 14A through 14D include reference datum lines to indicate relative motion of the valve stem. In the embodiment of FIG. 13, as the cam 184 rotates, indicated by reference "A" shown in FIG. 14A, the bearing surface 220 holds the cap 182 and the end of the rod 208 in the valve closed position. In this position, the cam provides a downward force against the rod 208 compressing the pressure spring 174 and seating the o-ring 201 against the vent seating surface 206, closing the vent seal 176. The cam also provides a downward force against the cap 182 compressing the valve spring 108 and urging the valve stem 122 downward, holding the closure valve 124 against the valve seat 120 as shown in FIG. 14AA, thereby closing the valve.

Figure 14B:
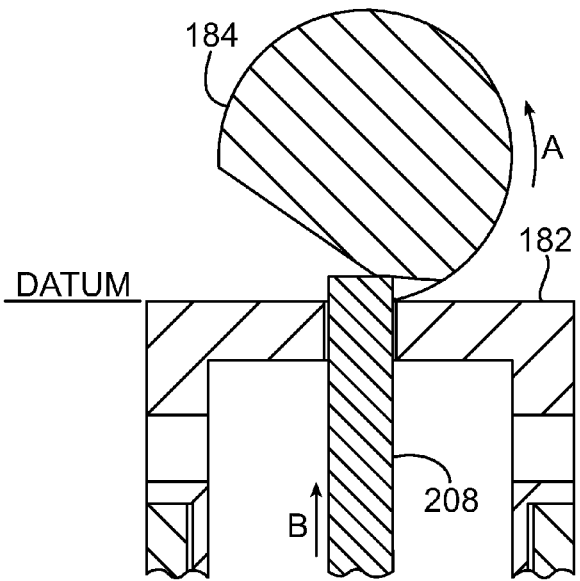

As the valve cam 184 rotates to a counter-pressure position in FIG. 14B, the groove 222 passes over the end of the rod 208 enabling the pressure spring 174 to urge the rod upward into the groove to remain in contact with the cam. As the rod lifts upward, indicated by reference "B" in FIG. 14B, the o-ring 210 disengages from the vent seating surface 206 thereby opening the vent seal 176 and enabling pressurizing gas in the head space of the reservoir to flow through the vent tube and into the container, while the cap 182 remains in contact with the bearing surface 220 adjacent the groove 222 urging the valve stem 122 downward in the valve closed position, as shown in FIG. 14AA. After the vent seal 176 opens, the container becomes approximately the same pressure as the head space of the reservoir 13 prior to the valve seat opening.

Figure 14C:
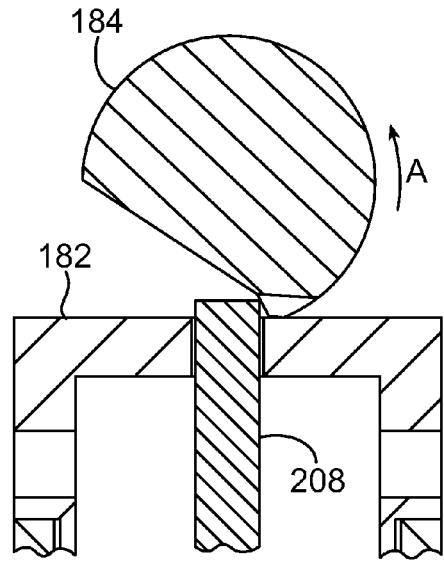

As the cam 184 continues to rotate as shown in FIG. 14C past the edge of the bearing surface, the cap begins to lift enabling the valve spring 180 to urge the valve stem 122 upward as shown in FIG. 14CC and indicated by reference "C" in FIG. 14C, and the cap 182 to remain in contact with the cam. As the valve stem 122 lifts, fluid begins to flow from the reservoir 13 through the valve seat 120 and into the container. The edge of the bearing surface may be configured to enable a partial opening of the valve to an intermediate position during this stage of rotation of cam 184, thereby providing a reduced flow rate through the valve seat 120 and into the container to minimize any production of foam at the beginning of the fill cycle, wherein the container is empty.

Figure 14D:
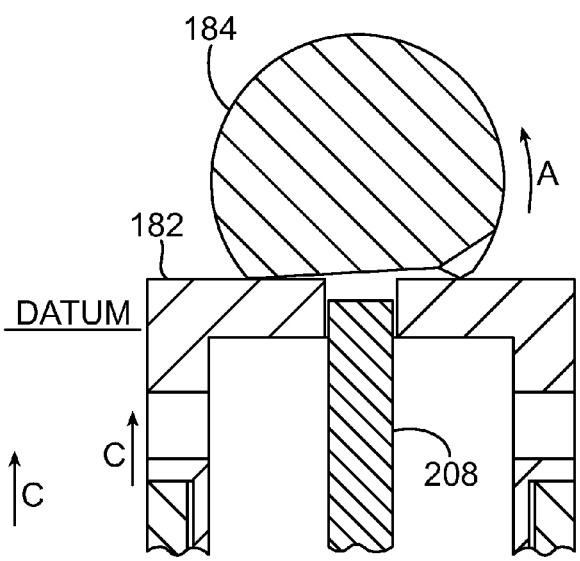
Figure 14A:
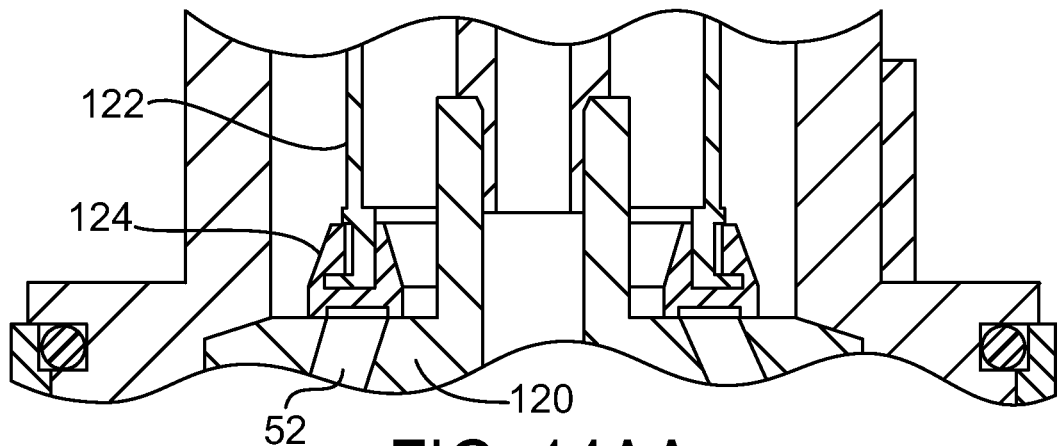
Figure 14C:
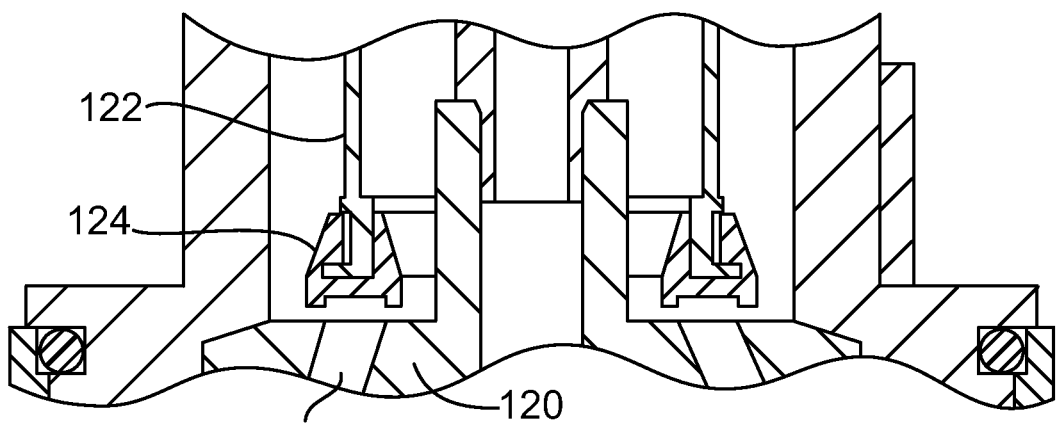
Figure 14D:
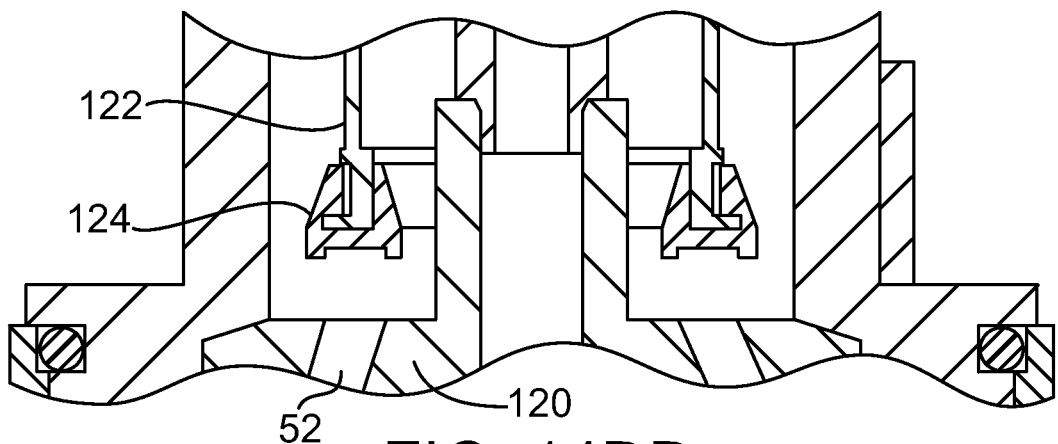

As the cam 184 continues to rotate to the raised position as shown in FIG. 14D, the recess 224 passes over the cap enabling the valve spring 180 to urge the valve stem 122 and cap upward to a full-open position as shown in FIG. 14DD, enabling the full flow rate of fluid through the valve seat 120. Further rotation of the cam engages the bearing surface 220 against the cap 182 and the end of the rod 208 to close the valve and compress the pressure spring 174 and the valve spring 180.

The cam 184 may be configured such that the intermediate position shown in FIGS. 14C and 14CC provides partial filling mode or a reduced flow rate useful for inhibiting foaming action of carbonated beverages and beer as the initial flow of fluid enters the container. After fluid begins to flow in the intermediate position with reduced flow reducing foaming, the cam 184 is rotated to provide a full-open flow rate in the open position shown in FIGS. 14D and 14DD providing efficient filling of the container with reduced foaming. The characteristics of the partial filling mode of operation may be altered by suitable design of the cam 184 to achieve the desired filling characteristics with a particular filling machine, beverage, or the like. Additionally, controlling the foaming caused by the initial flow into the container by using a reduced initial flow rate may enable the full-open flow rate to be increased over prior valves. It is contemplated that flow area of the orifice controlling the full-open flow rate may be increased by 50%, or may be increased by 85%, or greater over prior valves. For example, a prior orifice diameter was 0.171 inches, and it is contemplated that the orifice diameter may be increased to 0.250 inches or greater.

As the fluid level rises in the container, the volume of pressurizing gas displaced by fluid entering the container flows back through the vent tube 25 and into the reservoir 13. When the container contains a desired amount of fluid, an amount of pressurizing gas remains in the container above the fluid. After the valve cam moves to the lowered position pressing the cap 182 down and causing the valve to close, the snift valve 100 is actuated causing the pressurizing gas in the container to vent, returning the container to atmospheric pressure.

For certain beverages such as beer, air remaining in the container when the container is initially placed into the filling position may reduce the shelf life of the beverage as the air provides a source of oxygen trapped in the container after filling. The present actuating assembly 168 and snift valve 100 may be used with a method of evacuating air from the container prior to filling. After the container is in place for filling, the cam 184 rotates to the counter-pressure position with the groove 222 passing over the end of the rod 208, enabling the pressure spring 174 to urge the rod upward in the groove to remain in contact with the cam. As the rod lifts upward, the vent seal 176 opens enabling pressurizing gas such as nitrogen or carbon dioxide in the head space of the reservoir to flow through the vent tube and into the container. The snift valve 100 may be actuated to enable a flow of gas from the container to exit the valve thereby purging a substantial amount of air from the container replacing the air with gas from the head space in the fluid reservoir 13. Then, the valve seat may be opened to enable flow of fluid into the container. The snift valve 100 may be closed before, concurrent with, or after the valve seat is opened. It may be desired to reduce the loss of fluid passing through the snift valve with the pressuring gas by closing the snift valve 100 prior to or with the opening of the valve seat.

Figure 15:
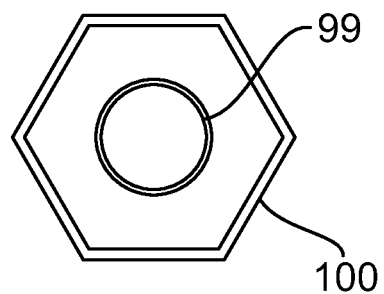
FIG. 15 is an end view of a snift valve for use with a filling valve.
Figure 16:
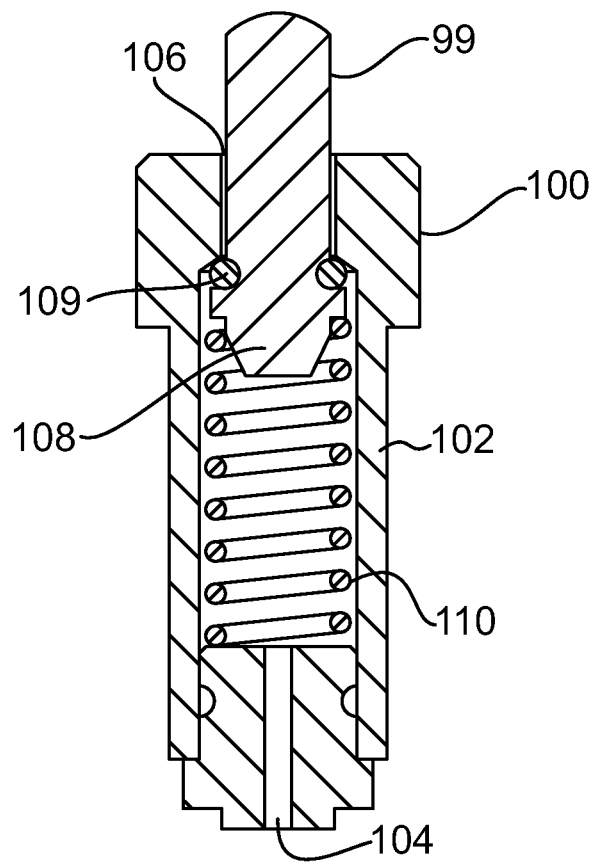
FIG. 16 is a cross sectional view through the snift valve of FIG. 14.

As discussed above, the snift valve 100 causes the pressurizing gas in the container to vent when the snift valve is opened. Turning now to FIGS. 15 and 16, the snift valve 100 may comprise an actuator, or plunger 99, movable between an extended position closing the valve and a depressed position opening the valve. The snift valve has a valve housing 102 having an inlet aperture 104 and an outlet aperture 106. The plunger 99 may be positioned extending from the outlet aperture 106, the plunger 99 comprising a seal portion 108 operatively sealing the outlet aperture 106 when the plunger 99 is in an extended position. The seal portion 108 may include an o-ring 109. Alternatively, the seal portion may seal the outlet aperture using other sealing techniques, such as a tapered fit, plug, washer, or other configuration for operatively sealing the outlet aperture 106 when the plunger 99 is in an extended position. The snift valve 100 includes a spring 110 positioned within the housing urging the plunger into the extended position operatively sealing the outlet aperture. The spring 110 may be a coil spring as shown in FIG. 16. The plunger 99 is movable from the valve closed, or extended position, to a depressed position opening the valve when the plunger is depressed into the housing 102. In one application, a stationary snift cam (not shown) is positioned adjacent a rotary filling machine positioned to depress the plunger as the filling valve moves past the snift cam. The snift cam may be shaped to engage and depress the plunger 99 in the valve open position for a desired duration. When the plunger disengages from the cam, the spring 110 pushes the plunger into the extended valve closed position.

The snift valve may have a variable flow rate for gas exiting through the snift valve during operation. In one alternative, a plunger 199 may have at least one intermediate position between the extended position and the depressed position where the rate of gas flow through the snift valve is lower in the intermediate position than the rate of gas flow in the depressed position. In one configuration, the release of pressurized gas is initially slowed for a desired duration, then after gas flow is initiated, the remainder of the pressurized gas is released at a higher rate. It is found that a staged release of the pressurized gas reduces foaming in certain liquids and reduces liquid loss through the snift valve.

Figure 18A:
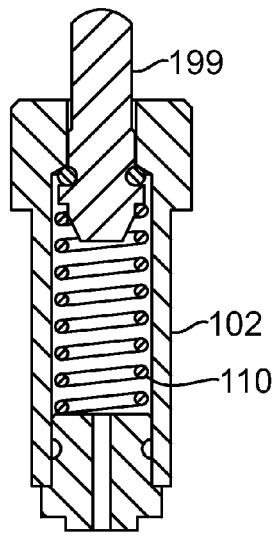
FIGS. 18A through 18C are cross sectional views through an alternative snift valve with the plunger at various stages of depression.
Figure 18B:
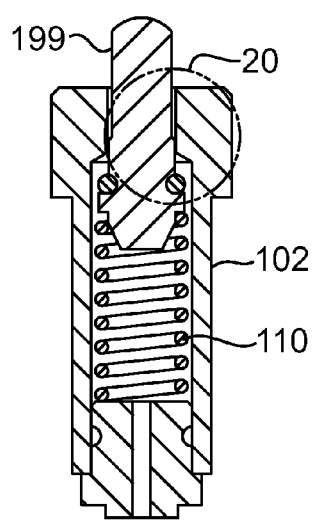
Figure 18C:
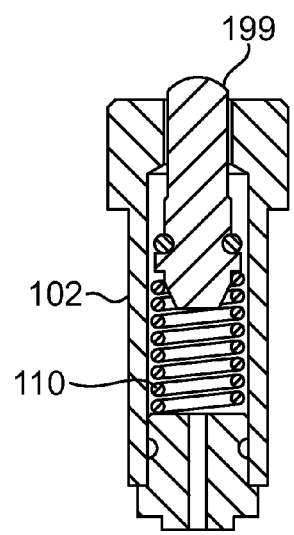
Figure 19:
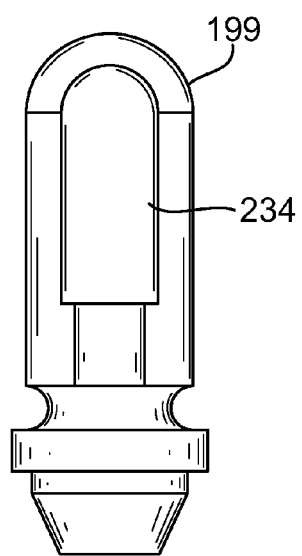
FIG. 19 is a plan view of the plunger of FIGS. 18A-18C apart from the snift valve.
Figure 20:
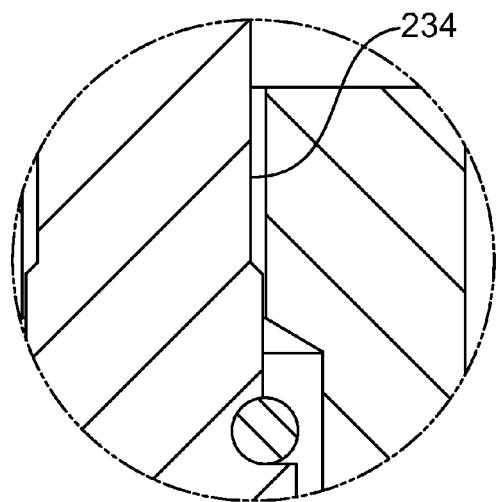
FIG. 20 is detail view of the view through the snift valve of FIG. 18B.

As shown in the embodiment of FIGS. 18 through 20, the gap between the outlet aperture 106 and the plunger 199 may vary as the plunger is depressed into the housing correspondingly varying the gas flow through the valve. As shown in FIGS. 19 and 20, the plunger 199 may have a step 234 on one or more sides of the plunger such that the gap between the plunger and the outlet aperture is smaller when the plunger is partially depressed in the intermediate position, and the gap between the plunger and the outlet aperture is larger when the plunger is fully depressed. Alternatively, or in addition, the shape of the output aperture may be varied to provide different gas flow rates as the plunger 99, 199 is depressed.

The snift cam (not shown) may be shaped to engage and partially depress the plunger 199 and hold the plunger in the intermediate position for a desired duration, then fully depress the plunger for a desired duration. It is contemplated that variations in plunger shape and diameter, outlet aperture shape and diameter, and snift cam shape and position may be varied, alone or in combination, to provide desired variation in the gas flow rate through the snift valve during its operation.

Figure 17:
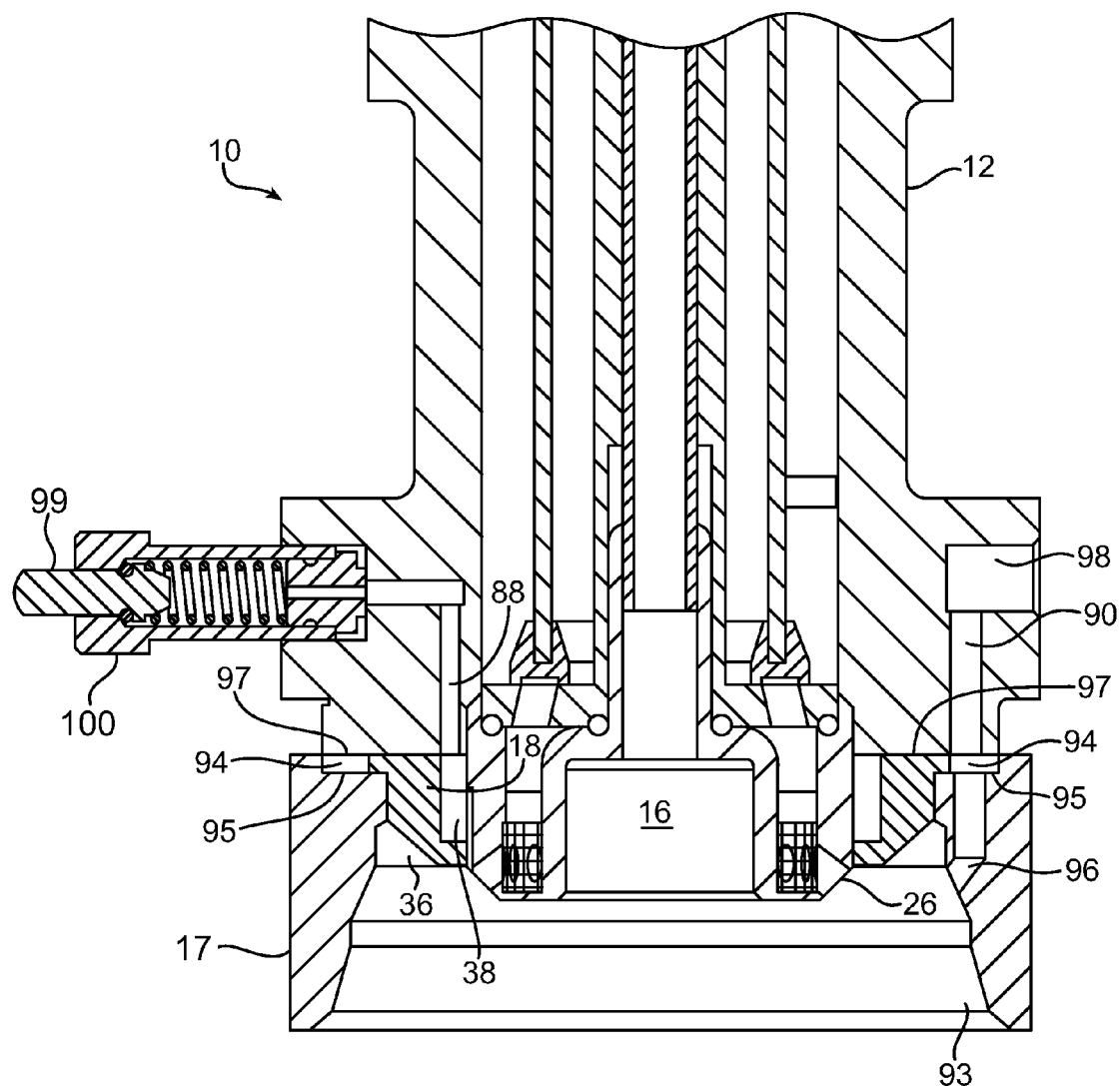
FIG. 17 is a partial cross sectional view through a valve showing a clean-in-place system associated therewith.

The fill valve 10 may also have a clean-in-place (CIP) system associated with housing 12. A first housing passageway 88 and a second housing passageway 90 may be formed in the housing 12. The first housing passageway 88 connects the seal cavity 38 to the snift valve. In the embodiment as shown in FIG. 17, the first housing passageway 88 comprises an aperture through a wall of the housing for directing pressurizing gas from the seal cavity 38 to the snift valve 100.

The bell 17 is capable of surrounding the opening of the container 15 when the container is in the filling position. The bell 17 may have a substantially cylindrical shape having an inner area 92 surrounding the nozzle 16, and a lower opening 93 through which the container 15 is positioned. The bell 17 attaches to the housing 12 forming a fluid cavity 94 between a lower surface of the valve body, or housing 12, and an upper surface of the bell. The bell 17 comprises a bell passageway 96, or duct, connecting the bell inner area 92 to the fluid cavity 94. An inner upper surface 95 of the bell 17 presses the mounting flange 36 of the seal 18 against a lower surface 97 of the housing 12. In this embodiment, the fluid cavity 94 is an area bounded by the mounting flange 36, the housing lower surface 97 and the bell upper surface 95. The fluid cavity 94 may extend 360° around the filling valve 10.

The second housing passageway 90 connects the fluid cavity 94 to an outlet 98. In the embodiment of FIG. 2, the second housing passageway 90 comprises an aperture through a wall of the valve body, or housing 12, for directing fluid from the fluid cavity 94 out of the housing. In one embodiment, the fluid cavity 94 extends less than 360° around the filling valve 10, extending approximately from the bell passageway 96 to the second housing passageway 90.

In one embodiment, the filling valve may be cleaned by filling the reservoir 13 with a cleaning fluid and circulating the cleaning fluid through the filling valve 10. In one cleaning method, a cleaning cup is positioned to sealably engage a lower portion of the bell 17, preventing fluid from flowing out of the lower opening 93 of the bell. In this embodiment, a cleaning fluid conduit is affixed between the second housing passageway 90 to direct cleaning solution out of outlet 98 to a remote recirculating pump and back to the reservoir 13.

When the filling valve is opened, cleaning fluid flows out of the reservoir 13, through the nozzle 16 and into the bell inner area 92. The cleaning fluid flows through the bell passageway 96 into the fluid cavity 94. The cleaning fluid flows from the fluid cavity 94 into the second housing passageway 90, through the cleaning fluid conduit and outlet 98 to a remote recirculating pump and back to the reservoir 13. In one cleaning method embodiment, the cleaning fluid is circulated at an elevated temperature. The cleaning fluid may be maintained in a temperature range of approximately 185-190° F. (approximately 85-88° C.). In one method embodiment, the fluid circulates for approximately 20 minutes. In this embodiment, the CIP system provides more uniform and thorough cleaning of the valve surfaces. The CIP discharge port 98 is routed through the centering bell 17 and into the CIP port in the valve body where it is sent to the main return line. As the snift actuator 99 is operated during cleaning, the CIP solution is made to pass around the inside of the seal 18, for proper cleaning of all surfaces. This arrangement eliminates a CIP button on a two button valve, which would sometimes allow leakage past the valve when associated o-rings wear causing a low fill/no fill container on that valve. It also would allow drainage from the CIP piping to drip into a can in the valve. The new design will allow The CIP solution to enter into a port drilled into the upper interior portion of the bell (well away from the can opening) and lead into an isolated channel formed by the bell when screwed onto the valve. A second port hole is drilled into the back of the valve body and exits into a hose fitting which allows the CIP solution to be returned back to the CIP skid where it is re heated and returned to the filler While the invention has been illustrated and described in detail in the foregoing drawings and description, the same is to be considered as illustrative and not restrictive in character, it being understood that only illustrative embodiments thereof have been shown and described and that all changes and modifications that come within the spirit of the invention are desired to be protected. Additional features of the invention will become apparent to those skilled in the art upon consideration of the description. Modifications may be made without departing from the spirit and scope of the invention.

What is claimed is:

1. A filling valve for filling a container comprising:
   a valve body having a chamber,
   a nozzle being connected to the chamber, the nozzle comprising an outlet and a peripheral surface about a central axis,
   a sealing member operably positioned around the peripheral surface for substantially preventing liquid from flowing into an area about the peripheral surface, and positioned above the outlet for sealably engaging a container,
   the outlet comprising a plurality of ports oriented in a downward direction defined by an outward angle and a tilt angle where the outward angle is within a range of 30° to 70° from a transverse plane perpendicular to the central axis of the nozzle, directing fluid in a swirling direction during filling of said container, the ports being positioned below the peripheral surface and each having an inlet in communication with the valve body chamber.

2. The filling valve of claim 1, where the tilt angle is within a range of approximately 10° to 40° from a radial plane.

3. The filling valve of claim 1, wherein the tilt angle is selected to form a swirl of liquid in association with the side walls of a container as the liquid is dispensed into the container.

4. The filling valve of claim 1, the plurality of ports having predetermined sizes to allow predetermined volumetric flow there through.

5. The filling valve of claim 1, further comprising a screen vertically positioned inside the nozzle and covering the port inlets.

6. A filling valve for filling a container comprising:
   a valve body having a chamber;
   a nozzle being connected to the chamber, the nozzle comprising an outlet and a peripheral surface about a central axis;
   a sealing member operably positioned around the peripheral surface for substantially preventing liquid from flowing into an area about the peripheral surface, and positioned above the outlet for sealably engaging a container; and
   a screen vertically positioned inside the nozzle and covering the port inlets;
   the outlet comprising a plurality of ports oriented in a downward direction defined by an outward angle and a tilt angle, directing fluid in a swirling direction during filling of said container, the ports being positioned below the peripheral surface and each having an inlet in communication with the valve body chamber.

7. The filling valve of claim 6, where the outward angle is within a range of approximately 30° to 70° from a transverse plane, and the tilt angle is within a range of approximately 10° to 40° from a radial plane.

8. The filling valve of claim 6, wherein the tilt angle is selected to form a swirl of liquid in association with the side walls of a container as the liquid is dispensed into the container.

9. The filling valve of claim 6, the plurality of ports having predetermined sizes to allow predetermined volumetric flow there through.

* * * * *